United States Patent
Frey et al.

(10) Patent No.: US 12,503,608 B2
(45) Date of Patent: Dec. 23, 2025

(54) ARTICLES INCLUDING NANOSTRUCTURED SURFACES AND INTERPENETRATING LAYERS, AND METHODS OF MAKING SAME

(71) Applicant: 3M INNOVATIVE PROPERTIES COMPANY, St. Paul, MN (US)

(72) Inventors: Matthew H. Frey, Cottage Grove, MN (US); Ta-Hua Yu, Woodbury, MN (US); Moses M. David, Wells, TX (US); Richard J. Pokorny, Maplewood, MN (US); Jun Ma, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 579 days.

(21) Appl. No.: 17/260,326

(22) PCT Filed: Aug. 19, 2019

(86) PCT No.: PCT/IB2019/056984
§ 371 (c)(1),
(2) Date: Jan. 14, 2021

(87) PCT Pub. No.: WO2020/044164
PCT Pub. Date: Mar. 5, 2020

(65) Prior Publication Data
US 2021/0292570 A1  Sep. 23, 2021

Related U.S. Application Data

(60) Provisional application No. 62/725,523, filed on Aug. 31, 2018.

(51) Int. Cl.
*C09D 4/00* (2006.01)
*B22D 23/04* (2006.01)
(Continued)

(52) U.S. Cl.
CPC .............. *C09D 4/00* (2013.01); *B22D 23/04* (2013.01); *B82B 3/0014* (2013.01); *C08K 3/36* (2013.01);
(Continued)

(58) Field of Classification Search
CPC .. C09D 1/00; C09D 4/00; B22D 23/04; B82B 3/0014; C08K 3/36; C08K 2201/011; B82Y 30/00; B82Y 40/00
See application file for complete search history.

(56) References Cited

U.S. PATENT DOCUMENTS 7,178,264 B2   2/2007   Kim
7,226,651 B2   6/2007   Hayashida
(Continued)

FOREIGN PATENT DOCUMENTS

CN   105977398       9/2016
CN   105977398 B  *  1/2018
(Continued)

OTHER PUBLICATIONS

Cn105977398B, Machine Translation. (Year: 2016).*
(Continued)

*Primary Examiner* — Maria V Ewald
*Assistant Examiner* — Ethan Weydemeyer
(74) *Attorney, Agent, or Firm* — Adrian L. Pishko

(57) ABSTRACT

The present disclosure provides an article including an organic layer having a nanostructured first surface including nanofeatures defining nanorecesses and an opposing second surface; and a ceramic layer disposed on the nanostructured first surface of the organic layer and filling at least a portion of the nanorecesses. The ceramic layer has a nanostructured first surface including nanofeatures and an opposing second surface, and the nanostructured first surface of the ceramic layer is interpenetrated with the nanostructured first surface (Continued)

of the organic layer. The present disclosure also provides a method of making the article. The method includes obtaining an organic layer having a nanostructured first surface including nanofeatures defining nanorecesses and an opposing second surface; and filling at least a portion of the nanorecesses of the nanostructured first surface of the organic layer with a ceramic material to form the article. In addition, the present disclosure provides articles including interpenetrating layers having different elastic storage moduli, such as non-metallic layers, and methods of making the articles. The articles can exhibit high abrasion resistance.

19 Claims, 9 Drawing Sheets

(51) Int. Cl.
| | |
|---|---|
| *B82B 3/00* | (2006.01) |
| *C08K 3/36* | (2006.01) |
| *C09D 1/00* | (2006.01) |
| *B82Y 30/00* | (2011.01) |
| *B82Y 40/00* | (2011.01) |

(52) U.S. Cl.
CPC ............... *C09D 1/00* (2013.01); *B82Y 30/00* (2013.01); *B82Y 40/00* (2013.01); *C08K 2201/011* (2013.01)

(56) References Cited

U.S. PATENT DOCUMENTS

| | | | |
|---|---|---|---|
| 7,297,374 | B1 | 11/2007 | Arney |
| 8,802,805 | B2 | 8/2014 | Yang |
| 9,340,683 | B2 | 5/2016 | Jing |
| 9,527,336 | B2 | 12/2016 | Mahli |
| 9,736,928 | B2 | 8/2017 | Frey |
| 2011/0310489 | A1 | 12/2011 | Kajiya |
| 2013/0164730 | A1 | 6/2013 | Gustafson |
| 2013/0258483 | A1 | 10/2013 | Pett |
| 2013/0299214 | A1 | 11/2013 | Frey |
| 2013/0319522 | A1 | 12/2013 | Koike et al. |
| 2014/0308477 | A1 | 10/2014 | Derks |
| 2015/0056412 | A1 | 2/2015 | Yu |
| 2016/0370506 | A1 | 12/2016 | David |
| 2017/0067150 | A1 | 3/2017 | David |
| 2017/0271623 | A1 | 9/2017 | Wang |
| 2018/0044245 | A1 | 2/2018 | Humpal |

FOREIGN PATENT DOCUMENTS

| | | |
|---|---|---|
| JP | 2009-276658 A | 11/2009 |
| JP | 5482651 | 5/2014 |
| JP | 2017-198747 A | 11/2017 |
| WO | WO 2007-146686 | 12/2007 |
| WO | WO 2009-002637 | 12/2008 |
| WO | WO 2010-078306 | 7/2010 |
| WO | 2012/077738 A1 | 6/2012 |
| WO | WO 2012-106417 | 8/2012 |

OTHER PUBLICATIONS

Ivankovic, "Abrasion Resistant Thin Partially Stabilised Zirconia Coatings by Sol-Gel Dip-Coating", Chemical and Biochemical Engineering Quarterly, 2005, vol. 19. No. 1, pp. 31-37.
Oliveira, "An Analysis of Fracture and Delamination in Thin Coatings Subjected to Contact Loading", Wear, 1996, vol. 198, pp. 15-32.
Petrovic, "Structure and Properties of Polyurethane—Silica Nanocomposites," Journal of Applied Polymer Science, 2000, vol. 76, pp. 133-151.
Ramezanzadeh, "A Study of Thermal—Mechanical Properties of an Automotive Coating Exposed to Natural and Simulated Bird Droppings," Journal of Thermal Analysis and Calorimetry, Oct. 2010, vol. 102, No. 1, pp. 13-21.
Rao, "Photocuring and Thermomechanical Properties of Multifunctional Amide Acrylate Compositions Derived from Castor Oil," Progress in Organic Coatings, 2010, vol. 67, No. 1, pp. 6-11.
Schmidt, "Organically Modified Ceramics and Their Applications", Journal of Non-Crystalline Solids, 1990, vol. 121, pp. 428-435.
Sugimoto, "Preparation and Properties of Poly(methylmethacrylate)—Silica Hybrid Materials Incorporating Reactive Silica Nanoparticles," Polymer, 2006, vol. 47, No. 11, pp. 3754-3759.
International Search Report for PCT International Application No. PCT/IB2019/056984, mailed on Jan. 2, 2020, 4 pages.

* cited by examiner

ARTICLES INCLUDING NANOSTRUCTURED SURFACES AND INTERPENETRATING LAYERS, AND METHODS OF MAKING SAME

CROSS REFERENCE TO RELATED APPLICATIONS

This application is a national stage filing under 35 U.S.C. 371 of PCT/IB2019/056984, filed Aug. 19, 2019, which claims the benefit of U.S. Application No. 62/725,523, filed Aug. 31, 2018, the disclosure of which is incorporated by reference in their entireties herein.

TECHNICAL FIELD

The present disclosure broadly relates to articles including nanostructured surfaces and methods of making such articles.

BACKGROUND

Numerous hard coats for plastic materials (e.g., films) have been developed to protect the plastic material. Certain solutions for protecting plastic materials, however, require exotic materials, many layers of material, and/or or complex or expensive (e.g., low throughput) processes. Thus, despite considerable progress in the development of such hard coats, there remains a need for further improvements in abrasion, impact, and scratch resistance, toward the performance of glass and other inorganic materials.

SUMMARY

In a first aspect, an article is provided. The article includes a) an organic layer having a nanostructured first surface including nanofeatures defining nanorecesses and an opposing second surface; and b) a ceramic layer disposed on the nanostructured first surface of the organic layer and filling at least a portion of the nanorecesses. The ceramic layer has a nanostructured first surface including nanofeatures and an opposing second surface, and the nanostructured first surface of the ceramic layer is interpenetrated with the nanostructured first surface of the organic layer.

In a second aspect, a method of making an article is provided. The method includes a) obtaining an organic layer having a nanostructured first surface comprising nanofeatures defining nanorecesses and an opposing second surface; and b) filling at least a portion of the nanorecesses of the nanostructured first surface of the organic layer with a ceramic layer of a ceramic material to form the article. The ceramic layer has a nanostructured first surface including nanofeatures and an opposing second surface, and the nanostructured first surface of the ceramic layer is interpenetrated with the nanostructured first surface of the organic layer.

In a third aspect, another article is provided. The article includes a) a first layer including a material with a first elastic storage modulus of between $1\times10^6$ and less than $1\times10^{10}$ pascals and having a nanostructured first surface including nanofeatures defining nanorecesses and an opposing second surface; and b) a second layer including a second material with a second elastic storage modulus of between greater than $1\times10^{10}$ and $1.3\times10^{12}$ pascals disposed on the nanostructured first surface of the first layer and filling the nanorecesses. The second material is non-metallic, the second layer has a nanostructured first surface including nanofeatures and an opposing second surface, and the nanostructured first surface of the second layer is interpenetrated with the nanostructured first surface of the first layer.

In a fourth aspect, another method of making an article is provided. The method includes a) obtaining a first layer including a first material with a first elastic storage modulus of between $1\times10^6$ and less than $1\times10^{10}$ pascals and having a nanostructured first surface comprising nanofeatures defining nanorecesses and an opposing second surface; and b) filling at least a portion of the nanorecesses of the nanostructured first surface of the first layer with a second layer of a second material with a second elastic storage modulus of between greater than $1\times10^{10}$ and $1.3\times10^{12}$ pascals to form the article. The second material is non-metallic, the second layer has a nanostructured first surface including nanofeatures and an opposing second surface, and the nanostructured first surface of the second layer is interpenetrated with the nanostructured first surface of the first layer.

In a fifth aspect, a further article is provided. The article includes a) a first layer including a material with a first elastic storage modulus and having a nanostructured first surface including nanofeatures defining nanorecesses and an opposing second surface; and b) a second layer including a second material with a second elastic storage modulus disposed on the nanostructured first surface of the first layer and filling the nanorecesses. The second layer has a nanostructured first surface that is interpenetrated with the nanostructured first surface of the first layer, and an opposing second surface. The second material is non-metallic, and the second elastic storage modulus is at least 1.5 times the first elastic storage modulus.

In a sixth aspect, a further method of making an article is provided. The method includes a) obtaining a first layer including a first material with a first elastic storage modulus and having a nanostructured first surface including nanofeatures defining nanorecesses and an opposing second surface; and b) filling at least a portion of the nanorecesses of the nanostructured first surface of the first layer with a second layer of a second material with a second elastic storage modulus to form the article. The second layer has a nanostructured first surface and an opposing second surface, and the nanostructure first surface of the second layer is interpenetrated with the nanostructured first surface of the first layer. The second material is non-metallic, and the second elastic storage modulus is at least 1.5 times the first elastic storage modulus.

Articles and methods according to at least certain embodiments of the present disclosure can provide architectures for durable (e.g., abrasion-resistant) articles, surfaces, and surface coatings.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

FIG. 3b is an SEM image of a top view of the nanostructured organic layer of FIG. 3a.

FIG. 4b is an SEM image of a top view of the nanostructured organic layer of FIG. 4a.

FIG. 5b is an SEM image of a top view of the nanostructured organic layer of FIG. 5a.

FIG. 8b is a schematic cross-sectional view, taken along the line 8b-8b, of the contoured article of FIG. 8a.

Figure 1:
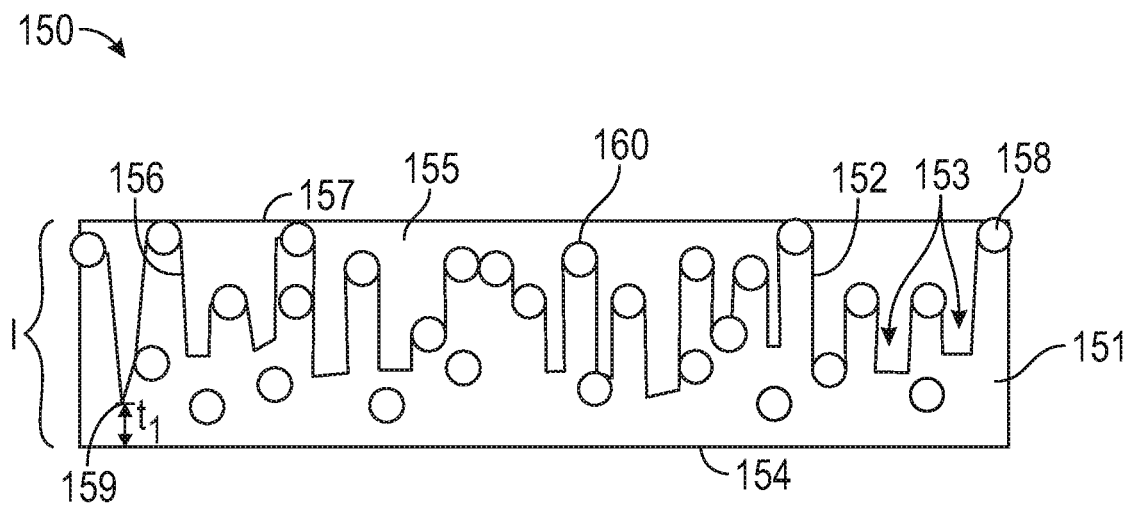
FIG. 1 is a schematic cross-sectional view of an exemplary article according to the present application.

While the above-identified figures set forth several embodiments of the disclosure, other embodiments are also contemplated, as noted in the description. The figures are not necessarily drawn to scale. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION OF ILLUSTRATIVE EMBODIMENTS

Glossary

The term "adjacent" as used herein refers to a material or a layer that can either be in contact with another material or layer (i.e., directly adjacent), or separated from another material or layer by an intermediary material, layer, or gap.

The term "amorphous material" refers to solid material derived from a liquid (e.g., melt, solution, or monomer(s)) and/or a vapor phase that lacks long range crystal structure as determined by X-ray diffraction.

The term "glass" as used herein refers to amorphous material exhibiting a glass transition temperature.

The term "glass-ceramic" as used herein refers to ceramics comprising crystals formed by heat-treating inorganic non-metallic amorphous material.

The term "ceramic layer" as used herein refers to a layer that comprises a majority (e.g., greater than 50 weight percent, greater than 60 weight percent, greater than 70 weight percent, greater than 80 weight percent, greater than 90 weight percent, or greater than 90 weight percent) of one or more inorganic non-metallic materials, and encompasses amorphous material (e.g., gel, glass, or organic-inorganic hybrid), crystalline ceramic material, glass-ceramic material, nanocomposite material, and combinations thereof.

The term "ceramic material" as used herein refers to a composition that comprises a majority (e.g., greater than 50 weight percent, greater than 60 weight percent, greater than 70 weight percent, greater than 80 weight percent, greater than 90 weight percent, or greater than 90 weight percent) of one or more inorganic non-metallic materials, and encompasses amorphous material (e.g., gel, glass, or organic-inorganic hybrid), crystalline ceramic material, glass-ceramic material, nanocomposite material, and combinations thereof.

The term "conformal" as used herein means that a material or layer follows the contour, or matches the shape of an adjacent surface. In other words, a conformal coating layer adjacent to a structured surface, for example, will have a substantially identical shape to the structured surface.

The term "coating" as used herein is meant to encompass both a liquid coating applied to a substrate and/or a solid layer formed on a substrate by application of the liquid coating. It will be clear to the skilled artisan in the context of the present application when the term "coating" refers to the liquid coating and when it refers to the formed (e.g., solid) layer. In some instances, the formed layer will be expressly described as "coating layer". The term "coating" is also meant to encompass a solid layer formed on a substrate by growth from a vapor (i.e., gas) phase.

The term "surrounds" as used herein refers to the manner in which a first material is disposed completely around (i.e., encloses on all sides) a second material in at least one reference plane.

The term "colorant" as used herein refers to a component that imparts color, including for instance, a pigment, a dye, and combinations thereof. The term "pigment" as used herein refers to a material loaded above its solubility resulting in non-dissolved (or non-dissolvable) particles.

The phrase "in planar contact" or "planarly contacting" is used to indicate that one layer or layered structure is contacting (and disposed either above or below) another layer or layered structure. Such contact is facial contact, rather than edge contact.

The term "organic layer" as used herein refers to a layer that comprises a majority (e.g., greater than 50 weight percent) of one or more materials including hydrocarbon compounds or their halogenated analogues, a three-dimensionally continuous polymeric matrix, or both.

As used herein, "nanostructured" refers to a surface that includes topography in the form of nanofeatures, wherein the nanofeatures comprise material that define the surface, and wherein at least one of the height of nanofeatures or the width of nanofeatures is less than about a micron (i.e., a micrometer, or 1000 nanometers). The nanofeatures of a nanostructured surface can define nanorecesses in the form of the negative space between nanofeatures.

As used herein, "transparent to visible light" refers to the level of transmission of the unpatterned substrate or of the article being 60 percent or more, 70 percent or more, 80 percent or more, 90 percent or more, 95 percent or more, or 98 percent or more transmissive to at least one polarization state of visible light, where the percent transmission is normalized to the intensity of the incident, optionally polarized light. The term "visible" in connection with "transparent to visible light" is modifying the term "light," so as to specify the wavelength range of light for which the article is transparent.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

Articles

In a first aspect, an article is provided. The article includes a) an organic layer having a nanostructured first surface including nanofeatures defining nanorecesses and an opposing second surface; and b) a ceramic layer disposed on the nanostructured first surface of the organic layer and filling at least a portion of the nanorecesses. The ceramic layer has a nanostructured first surface including nanofeatures and an opposing second surface, and the nanostructured first surface of the ceramic layer is interpenetrated with the nanostructured first surface of the organic layer. It has been discovered that it is possible to form an interpenetrating layer of a ceramic material on a nanostructured organic layer having nanorecesses, filling at least a portion of the nanorecesses. As used herein, the phrase "filling at least a portion of the nanorecesses" means that some or all of the individual nanorecesses are filled, and that the filled nanorecesses are completely filled. Stated another way, whichever of the nanorecesses (e.g., either a portion or all of the nanorecesses) are filled, those nanorecesses are filled to the top instead of being only partially filled. Stated another way, "filling at least a portion of the nanorecesses" is equivalent to "completely filling at least a portion of the nanorecesses." Completely filling a nanorecess (also referred to herein as "filled to the top") means that essentially the entire volume of the cavity, bounded by the surface of the nanorecess and a plane that contacts the highest nanofeatures adjacent to said nanorecess, is filled.

Surprisingly, each of chemical vapor deposition (CVD) and chemical solution deposition (CSD) were discovered to be capable of filling the nanorecesses with a ceramic material (e.g., via CVD), with a sol-gel composition (e.g., via CSD), or a pre-ceramic polymer composition (e.g., via CSD) with few to no surface pores, flaking off of the ceramic layer, or failure to provide interpenetration of the ceramic material with the organic layer. Advantageously, it has been found that the resulting article unexpectedly exhibits greater abrasion resistance than an article in which the organic layer and the ceramic layer have directly adjacent major surfaces that are not nanostructured and that do not interpenetrate.

FIG. 1 is a schematic cross-sectional view of an exemplary article 150 according to the present application. The article 150 comprises an organic layer 151 having a nanostructured first surface comprising nanofeatures 152 defining nanorecesses 153 and an opposing second surface 154; and a ceramic layer 155 disposed on the nanostructured first surface of the organic layer 151 and filling at least a portion of the nanorecesses 153, wherein the ceramic layer 155 has a nanostructured first surface comprising nanofeatures 156 and an opposing second surface 157, wherein the nanostructured first surface of the ceramic layer 155 is interpenetrated I with the nanostructured first surface of the organic layer 151.

It is known that for multilayer articles, a mismatch of elastic properties (e.g., elastic storage modulus) can contribute to redistribution of applied stress and a greater occurrence of mechanical failure. (See, e.g., Oliveira et al. "An analysis of fracture and delamination in thin coatings subjected to contact loading", Wear (1996) pp. 15-32.) It has been discovered, however, that the inclusion of interpenetrated nanofeatures according to at least certain embodiments of the present disclosure results in a decrease in mechanical failure with applied stress. Without wishing to be bound by theory, it is believed that the presence of the (e.g., vertically) interpenetrating nanostructured surfaces of the two (e.g., horizontal) layers having mismatched elastic storage modulus values helps to decrease and/or diffuse applied stress, as reflected in improved abrasion resistance compared to the same two layers that do not have interpenetrating nanostructured surfaces (e.g., including nanofeatures generally perpendicular to the major surfaces of the layers).

In certain embodiments, the organic layer exhibits an elastic storage modulus of between $1\times10^6$ and less than $1\times10^{10}$ pascals. In some embodiments, the organic layer may exhibit an elastic storage modulus of $1\times10^6$ pascals or greater, $2.5\times10^6$ pascals or greater, $5\times10^6$ pascals or greater, $7.5\times10^6$ pascals or greater, $1\times10^7$ pascals or greater, $2.5\times10^7$ pascals or greater, $5\times10^7$ pascals or greater, $7.5\times10^7$ pascals or greater, or $1\times10^8$ pascals or greater; less than $1\times10^{10}$ pascals, $7.5 \times 10^9$ pascals or less, $5 \times 10^9$ pascals or less, $2.5 \times 10^9$ pascals or less, $1 \times 10^9$ pascals or less, $7.5 \times 10^8$ pascals or less, or $5 \times 10^8$ pascals or less; or between $1 \times 10^6$ and $9.5 \times 10^9$ pascals, between $2.5 \times 10^6$ and $7.5 \times 10^9$ pascals, between $5 \times 10^6$ and $5 \times 10^9$ pascals, between $7.5 \times 10^6$ and $2.5 \times 10^9$ pascals, between $1 \times 10^7$ and $1 \times 10^9$ pascals, between $2.5 \times 10^7$ and $7.5 \times 10^8$ pascals, or between $5 \times 10^7$ and $5 \times 10^8$ pascals.

In certain embodiments, the organic layer exhibits an elastic modulus loss tangent of 0.02 or greater, 0.03 or greater, 0.04 or greater, 0.05 or greater, 0.075 or greater, 0.1 or greater, 0.2 or greater, 0.3 or greater, 0.4 or greater, or 0.5 or greater; and 2 or less, 1.8 or less, 1.6 or less, 1.4 or less, 1.2 or less, or 1 or less. In some embodiments, the organic layer may exhibit an elastic modulus loss tangent of between 0.02 and 2, between 0.03 and 1, or between 0.04 and 2. Each of the elastic storage modulus and the elastic modulus loss tangent of a material can be determined according to dynamic mechanical analysis (DMA) for macroscale measurements and according to nanoindentation or atomic force microscopy (AFM) for microscale measurements.

In certain embodiments, the ceramic layer exhibits an elastic storage modulus of greater than $1 \times 10^{10}$ pascals, $1.5 \times 10^{10}$ pascals or greater, $2 \times 10^{10}$ pascals or greater, $2.5 \times 10^{10}$ pascals or greater, $3.0 \times 10^{10}$ pascals or greater, $3.5 \times 10^{10}$ pascals or greater, or $4 \times 10^{10}$ pascals or greater; and $1.3 \times 10^{12}$ pascals or less, $1.0 \times 10^{12}$ pascals or less, $8 \times 10^{11}$ pascals or less, $6 \times 10^{11}$ pascals or less, $4 \times 10^{11}$ pascals or less, $2 \times 10^{11}$ pascals or less, $1 \times 10^{11}$ pascals or less, $9.0 \times 10^{10}$ pascals or less, $7.5 \times 10^{10}$ pascals or less, $6.0 \times 10^{10}$ pascals or less, or $5.0 \times 10^{10}$ pascals or less. In some embodiments, the ceramic layer may exhibit an elastic storage modulus of between greater than $1 \times 10^{10}$ and $1.3 \times 10^{12}$ pascals, $2 \times 10^{10}$ to $1 \times 10^{11}$ pascals, $2.5 \times 10^{10}$ to $7.5 \times 10^{10}$ pascals, or $3.0 \times 10^{10}$ to $6.0 \times 10^{10}$ pascals. The elastic storage modulus can be determined according to DMA or AFM, as noted above.

In a third aspect, another article is provided. The article comprises:
a. a first layer comprising a material with a first elastic storage modulus of between $1 \times 10^6$ and less than $1 \times 10^{10}$ pascals and having a nanostructured first surface comprising nanofeatures defining nanorecesses and an opposing second surface; and
b. a second layer comprising a second material with a second elastic storage modulus of between greater than $1 \times 10^{10}$ and $1.3 \times 10^{12}$ pascals disposed on the nanostructured first surface of the first layer and filling the nanorecesses; wherein the second material is non-metallic; wherein the second layer has a nanostructured first surface comprising nanofeatures and an opposing second surface; and wherein the nanostructured first surface of the second layer is interpenetrated with the nanostructured first surface of the first layer.

Hence, referring again to FIG. 1, an exemplary article 150 according to the third aspect of the present application comprises a first layer 151 comprising a first material with a first elastic storage modulus of between $1 \times 10^6$ and less than $1 \times 10^{10}$ pascals (e.g., up to but not including $1 \times 10^{10}$ pascals) and having a nanostructured first surface comprising nanofeatures 152 defining nanorecesses 153 and an opposing second surface 154; and a second layer 155 comprising a second material with a second elastic storage modulus of between greater than $1 \times 10^{10}$ and $1.3 \times 10^{12}$ pascals disposed on the nanostructured first surface of the first layer 151 and filling at least a portion of the nanorecesses 153, wherein the second layer 155 has a nanostructured first surface comprising nanofeatures 156 and an opposing second surface 157, wherein the nanostructured first surface of the second layer 155 is interpenetrated I with the nanostructured first surface of the first layer 151, wherein the second material is a non-metallic material. The first layer and the second layer hence have different elastic storage modulus values from each other. The second layer has a higher elastic storage modulus value than the first layer (i.e., the second elastic storage modulus is greater than the first elastic storage modulus).

In some embodiments, the first elastic storage modulus is $1 \times 10^6$ pascals or greater, $2 \times 10^6$ pascals or greater, $3 \times 10^6$ pascals or greater, $4 \times 10^6$ pascals or greater, $5 \times 10^6$ pascals or greater, $6 \times 10^6$ pascals or greater, $7 \times 10^6$ pascals or greater, $8 \times 10^6$ pascals or greater, $9 \times 10^6$ pascals or greater, $1 \times 10^7$ pascals or greater, $2 \times 10^7$ pascals or greater, $4 \times 10^7$ pascals or greater, $6 \times 10^7$ pascals or greater, $8 \times 10^7$ pascals or greater, $9.5 \times 10^7$ pascals or greater; and $9.5 \times 10^9$ pascals or less, $9 \times 10^9$ pascals or less, $8 \times 10^9$ pascals or less, $7 \times 10^9$ pascals or less, $6 \times 10^9$ pascals or less, $5 \times 10^9$ pascals or less, $4 \times 10^9$ pascals or less, $3 \times 10^9$ pascals or less, $2 \times 10^9$ pascals or less, $1 \times 10^9$ pascals or less, $9 \times 10^8$ pascals or less, $8 \times 10^8$ pascals or less, $6 \times 10^8$ pascals or less, $5 \times 10^8$ pascals or less, $3 \times 10^8$ pascals or less, or $2 \times 10^8$ pascals or less; or between $1 \times 10^6$ and $9.5 \times 10^9$ pascals, between $2.5 \times 10^6$ and $7.5 \times 10^9$ pascals, between $5 \times 10^6$ and $5 \times 10^9$ pascals, between $7.5 \times 10^6$ and $2.5 \times 10^9$ pascals, between $1 \times 10^7$ and $1 \times 10^9$ pascals, between $2.5 \times 10^7$ and $7.5 \times 10^8$ pascals, or between $5 \times 10^7$ and $5 \times 10^8$ pascals. In some embodiments, the second elastic storage modulus is $1.2 \times 10^{10}$ pascals or greater, $2 \times 10^{10}$ pascals or greater, $3 \times 10^{10}$ pascals or greater, $4 \times 10^{10}$ pascals or greater, $5 \times 10^{10}$ pascals or greater, $6 \times 10^{10}$ pascals or greater, $7 \times 10^{10}$ pascals or greater, $8 \times 10^{10}$ pascals or greater, $9 \times 10^{10}$ pascals or greater, $1 \times 10^{11}$ pascals or greater, or $1.5 \times 10^{11}$ pascals or greater; and $1.3 \times 10^{12}$ pascals or less, $1 \times 10^{12}$ pascals or less, $9.5 \times 10^{11}$ pascals or less, $9 \times 10^{11}$ pascals or less, $8.5 \times 10^{11}$ pascals or less, $8 \times 10^{11}$ pascals or less, $7.5 \times 10^{11}$ pascals or less, $7 \times 10^{11}$ pascals or less, $6 \times 10^{11}$ pascals or less, $5 \times 10^{11}$ pascals or less, $4 \times 10^{11}$ pascals or less, $3 \times 10^{11}$ pascals or less, or $2 \times 10^{11}$ pascals or less. In some embodiments, the first elastic storage modulus can be between $1 \times 10^6$ and $9.5 \times 10^9$ pascals and the second elastic storage modulus can be between $1.2 \times 10^{10}$ and $1.3 \times 10^{12}$ pascals; or the first elastic storage modulus can be between $1 \times 10^6$ and $7.5 \times 10^9$ pascals and the second elastic storage modulus can be between $2 \times 10^{10}$ and $1 \times 10^{12}$ pascals. Organic coatings with elastic storage modulus of between $1 \times 10^8$ and $1 \times 10^9$ pascals are described in, for example, B. S. Rao and Aruna Palanisamy, "Photocuring and thermomechanical properties of multifunctional amide acrylate compositions derived from castor oil," *Progress in Organic Coatings* 67 6-11 (2010). Organic coatings with elastic storage modulus of between $1 \times 10^6$ and $1 \times 10^8$ pascals are described in, for example, ZORAN S. PETROVIC, IVAN JAVNI, ALAN WADDON, GYORGY BANHEGYI, "Structure and Properties of Polyurethane-Silica Nanocomposites," *Journal of Applied Polymer Science* 76 133-151 (2000).

In a fifth aspect, a further article is provided. The article comprises:
a. a first layer comprising a material with a first elastic storage modulus and having a nanostructured first surface comprising nanofeatures defining nanorecesses and an opposing second surface; and
b. a second layer comprising a second material with a second elastic storage modulus disposed on the nanostructured first surface of the organic layer and filling the nanorecesses;

wherein the second layer has a nanostructured first surface that is interpenetrated with the nanostructured first surface of the first layer, and an opposing second surface; wherein the second material is non-metallic; and wherein the second elastic storage modulus is at least 1.5 times the first elastic storage modulus.

Hence, referring again to FIG. 1, an exemplary article 150 according to the fifth aspect of the present application comprises a first layer 151 comprising a material with a first elastic storage modulus and having a nanostructured first surface comprising nanofeatures 152 defining nanorecesses 153 and an opposing second surface 154; and a second layer 155 with a second elastic storage modulus disposed on the nanostructured first surface of the first layer 151 and filling at least a portion of the nanorecesses 153, wherein the second layer 155 has a nanostructured first surface comprising nanofeatures 156 and an opposing second surface 157, wherein the nanostructured first surface of the second layer 155 is interpenetrated I with the nanostructured first surface of the first layer 151, wherein the second layer 155 is non-metallic, and wherein the second elastic storage modulus is at least 1.5 times the first elastic storage modulus. In certain embodiments, the second elastic storage modulus is 1.5 times or more than the first elastic storage modulus, 2.0 times or more, 3.0 times or more, 5.0 times or more, 7.5 times or more, 10.0 times or more, or 12.5 times or more than the first elastic storage modulus.

The second layer of each of the third and fifth aspects is composed of one or more materials that are non-metallic. This is because metals and metallic materials (e.g., metal elements and/or their alloys or intermetallic compounds, etc.) are not suitable for applications where the article is required to be transparent to visible light, transparent to electromagnetic waves (e.g., radio waves, microwaves), or arbitrarily colored (as achievable by incorporation of dyes or pigments into polymers).

Preferably, the article is transparent to visible light. An advantage to having the article transparent to visible light is its suitability for numerous applications, for instance applications involving replacing the use of a (e.g., transparent) glass substrate.

The below disclosure relates to articles of each of the first, third, and fifth aspects.

In the embodiment depicted in FIG. 1, the opposing second surface 157 of the ceramic layer (or second layer) 155 may be in contact with a number of the nanofeatures 152 of the organic layer (or first layer) 151. In contrast, in other embodiments, the ceramic layer (or second layer) may "overcoat" the nanofeatures of the organic layer (or first layer) by having a thickness greater than the height of some or all of the nanofeatures of the organic layer (or first layer) (see, e.g., FIG. 2). In some embodiments, the organic layer (or first layer) 151 has a thickness $t_1$ between the opposing second surface 154 of the organic layer (or first layer) 151 and a surface 159 of the nanorecesses proximal to the opposing second surface of the organic layer (or first layer) 154 of, for example, 0.5 micrometer or greater, 1 micrometer or greater, 1.5 micrometers or greater, 2 micrometers or greater, 2.5 micrometers or greater, 3 micrometers or greater, or 5 micrometers or greater; and, for example, 1 centimeter or less, 7.5 millimeters or less, 5 millimeters or less, 3 millimeters or less, 1 millimeter or less, 500 micrometers or less, 100 micrometers or less, 50 micrometers or less, or 25 micrometers or less. In some embodiments, the organic layer (or first layer) may have a thickness $t_1$ between the opposing second surface of the organic layer (or first layer) and a surface of the nanorecesses proximal to the opposing second surface of the organic layer (or first layer) of, for example, 0.5 micrometer to 1 centimeter, 1 micrometer to 7.5 millimeters, 2 micrometers to 5 millimeters, or 5 micrometers to 3 millimeters.

The nanostructured surfaces can each comprise nanofeatures such as, for example, nano-pillars or nano-columns, or continuous nano-walls comprising nano-pillars or nano-columns. Preferably, the nanofeatures have steep side walls that are generally perpendicular to the opposing second surface of the first or second layer.

In any embodiment, the nanostructured surface of the organic layer (or first layer) comprises nanofeatures having a height-to-width ratio of at least 1.5 to 1, at least 2 to 1, at least 3 to 1, at least 4 to 1, or at least 5 to 1. Concomitantly, the nanorecesses defined by the nanofeatures of the organic layer (or first layer) may have a depth-to-width ratio of at least 1.5 to 1, at least 2 to 1, at least 3 to 1, at least 4 to 1, or at least 5 to 1. The nanostructured surface typically, but not necessarily, comprises nanofeatures that have lateral spacing (i.e., spacing at about half the height of the nanofeatures, in the plane of the nanostructured major surface) of from 5 to 500 nanometers, in some cases from 15 to 100 nanometers. The lateral spacing at about half the height of the nanofeatures, in the plane of the nanostructured major surface, can be determined microscopically by sectioning the nanostructured surface normal to the major surface and measuring the distance (e.g., by transmission electron microscopy).

The nanostructured surface of the organic layer (or first layer) typically, but not necessarily, comprises nanofeatures having a (e.g., average) height of 25 nanometers (nm) or greater, 30 nm or greater, 40 nm or greater, 50 nm or greater, 60 nm or greater, 70 nm or greater, 80 nm or greater, 90 nm or greater, 100 nm or greater, 150 nm or greater, 200 nm or greater, or 250 nm or greater; and 2000 nm or less, 1500 nm or less, 1000 nm or less, 750 nm or less, 600 nm or less, 500 nm or less, 400 nm or less, or 300 nm or less. In some embodiments, the nanostructured surface of the organic layer (or first layer) may comprise nanofeatures having a (e.g., average) height of from 25 to 2000 nm, 50 to 1000 nm, 100 to 750 nm, or 150 to 500 nm.

Likewise, the nanorecesses defined by the nanofeatures of the organic layer (or first layer) may have a depth of from 25 to 2000 nm. More particularly, the nanorecesses defined by the nanofeatures of the organic layer (or first layer) may have a depth of 25 nanometers (nm) or greater, 30 nm or greater, 40 nm or greater, 50 nm or greater, 60 nm or greater, 70 nm or greater, 80 nm or greater, 90 nm or greater, 100 nm or greater, 150 nm or greater, 200 nm or greater, or 250 nm or greater; and 2000 nm or less, 1500 nm or less, 1000 nm or less, 750 nm or less, 600 nm or less, 500 nm or less, 400 nm or less, or 300 nm or less. In some embodiments, the nanorecesses defined by the nanofeatures of the organic layer (or first layer) may have a depth of from 25 to 2000 nm, 50 to 1000 nm, 100 to 750 nm, or 150 to 500 nm.

In certain embodiments, the nanostructured surface of the organic layer (or first layer) comprises nanofeatures having a regular height, whereas in other embodiments the nanostructured surface of the organic layer (or first layer) comprises nanofeatures having varying heights. This can depend on the method of forming the nanostructured surface. For instance, if reactive ion etching is performed by using a suitable mask, such as a monolayer of nanoparticles, a discontinuous etch mask, or a patterned etch mask, the height of the etched features would be the same, since the etch mask is at a fixed height. In contrast, when nanoparticles are used as an etch mask within the volume of a hard coat, whose thickness is much greater than the particle diameter, there are nanoparticle etch masks located at different heights, resulting in etched structures of varying height. Other methods for forming a nanostructured surface comprising nanofeatures defining nanorecesses, on an organic layer (or first layer), are based on nanoreplication, for example as described in PCT Application Publication No. WO 2009/002637A2 (Zhang et al.).

Figure 2:
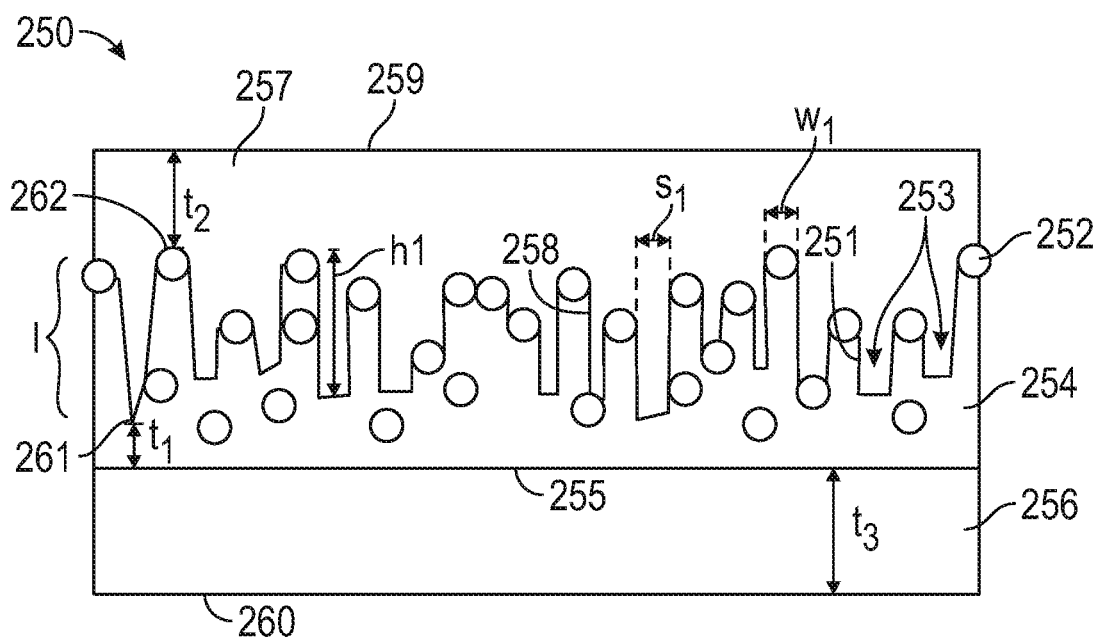
FIG. 2 is a schematic cross-sectional view of another exemplary article according to the present application.

Referring to FIG. 2, a schematic cross-sectional view of another exemplary article 250 is provided. The article 250 comprises an organic layer (or first layer) 254 having a nanostructured first surface comprising nanofeatures 251 defining nanorecesses 253 and an opposing second surface 255; and a ceramic layer (or second layer) 257 disposed on the nanostructured first surface of the organic layer (or first layer) 254 and filling at least a portion of the nanorecesses 253, wherein the ceramic layer (or second layer) 257 has a nanostructured first surface comprising nanofeatures 258 and an opposing second surface 259, wherein the nanostructured first surface of the ceramic layer 257 is interpenetrated I with the nanostructured first surface of the organic layer 254. The organic layer 254 can be made via reactive ion etching, where $S_1$ depicts the spacing between two nanofeatures 251 defined by the reactive ion etching process and the positions of nanoparticles (e.g., dispersed phase) 252 in the organic layer 254. The width of a nanofeature 251 is identified as $W_1$, and the height of a nanofeature 251 is identified as hi.

The ceramic layer (or second layer) 257 typically, but not necessarily, has a thickness $t_2$ between the opposing second surface of the ceramic layer (or second layer) 259 and a surface 262 of the nanofeatures proximal to the opposing second surface of the ceramic layer (or second layer) 259 of 50 nanometers (nm) or greater, 75 nm or greater, 100 nm or greater, 125 nm or greater, 150 nm or greater, 175 nm or greater, 200 nm or greater, 225 nm or greater, 250 nm or greater, 275 nm or greater, or 300 nm or greater; and 10 micrometers or less, 5 micrometers or less, 4 micrometers or less, or 3 micrometers or less, 2 micrometers or less, or 1 micrometer or less. In some embodiments, the ceramic layer (or second layer) may have a thickness between the opposing second surface of the ceramic layer and a surface of the nanofeatures proximal to the opposing second surface of the ceramic layer (or second layer) 259 of 50 nm to 10 micrometers, 100 nm to 5 micrometers, 200 nm to 3 micrometers, 250 nm to 2 micrometers, or 300 nm to 1 micrometer.

The article 250 further comprises an optional polymer substrate 256 adjacent to the opposing second surface 255 of the organic layer. Suitable materials for the polymer substrate include polyethylene terephthalate (PET), cyclo-olefin polymer (COP), cyclo-olefin copolymer (COC), poly(ethylenenaphthalate) (PEN), polycarbonate (PC), epoxy, poly(methylmethacrylate) (PMMA), polyimide (PI), and mixtures or copolymers including these materials. The thickness $t_3$ of the polymer substrate 256 is not particularly limited, and may range from a thickness of 5 micrometers to 1 centimeter, 10 micrometers to 500 millimeters, or 50 micrometers to 250 millimeters. Stated another way, the polymer substrate may have a thickness of 5 micrometers or more, 7 micrometers or more, 10 micrometers or more, 20 micrometers or more, 35 micrometers or more, 50 micrometers or more, 75 micrometers or more, 100 micrometers or more, 250 micrometers or more, 500 micrometers or more, 750 micrometers or more, or 1 millimeter or more; and 1 centimeter or less, 900 millimeters or less, 800 millimeters or less, 700 millimeters or less, 600 millimeters or less, 500 millimeters or less, 350 millimeters or less, 250 millimeters or less, 100 millimeters or less, 50 millimeters or less, 25 millimeters or less, or 10 millimeters or less. Further, additional suitable substrates could include painted or graphics printed substrates including metals, plastics, and glass.

Figure 3A:
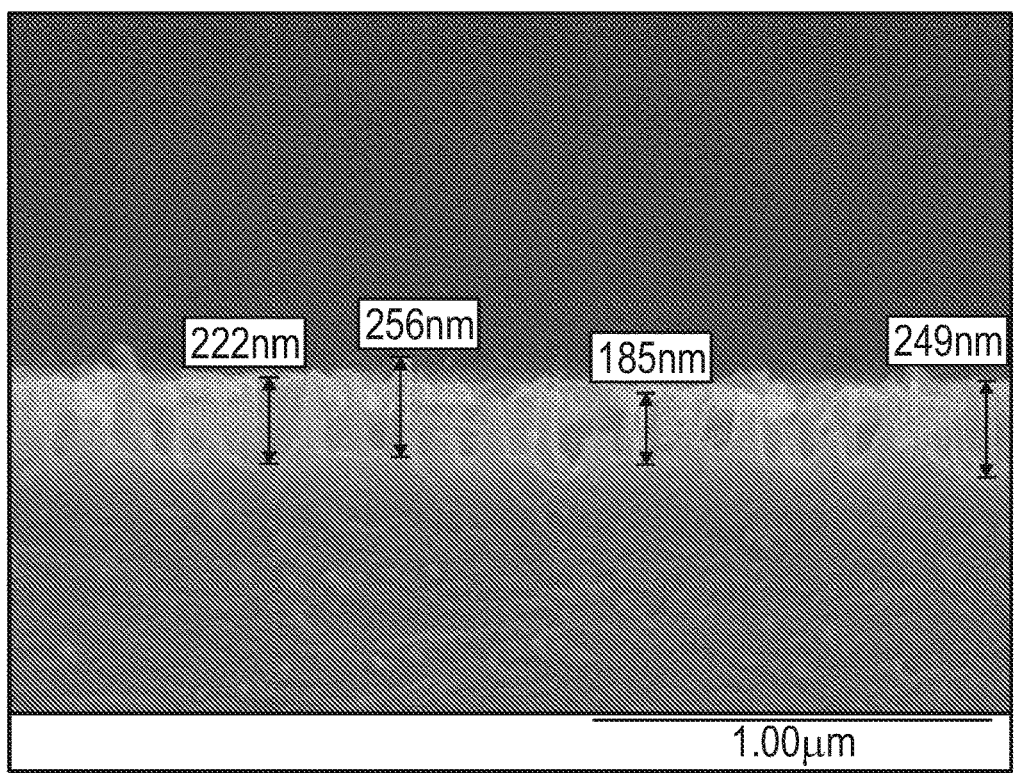
FIG. 3a is a scanning electron microscopy (SEM) image of a cross-section of an exemplary nanostructured organic layer containing 4 weight percent (wt. %) silica nanoparticles, according to the present application.
Figure 3B:
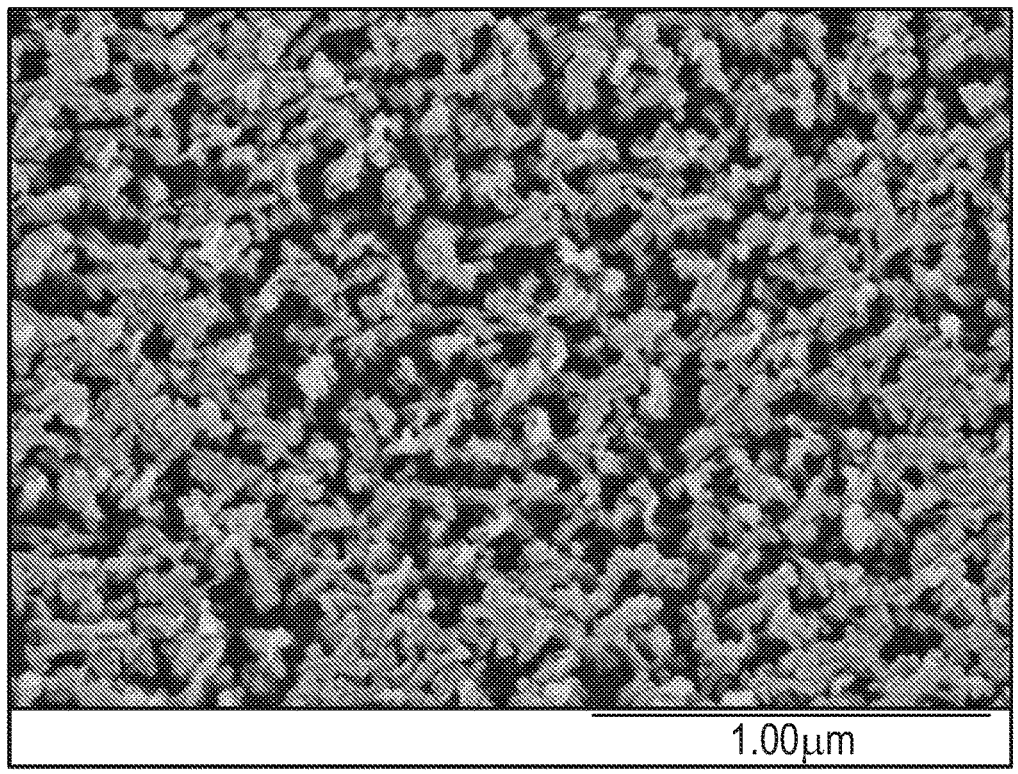
Figure 3C:
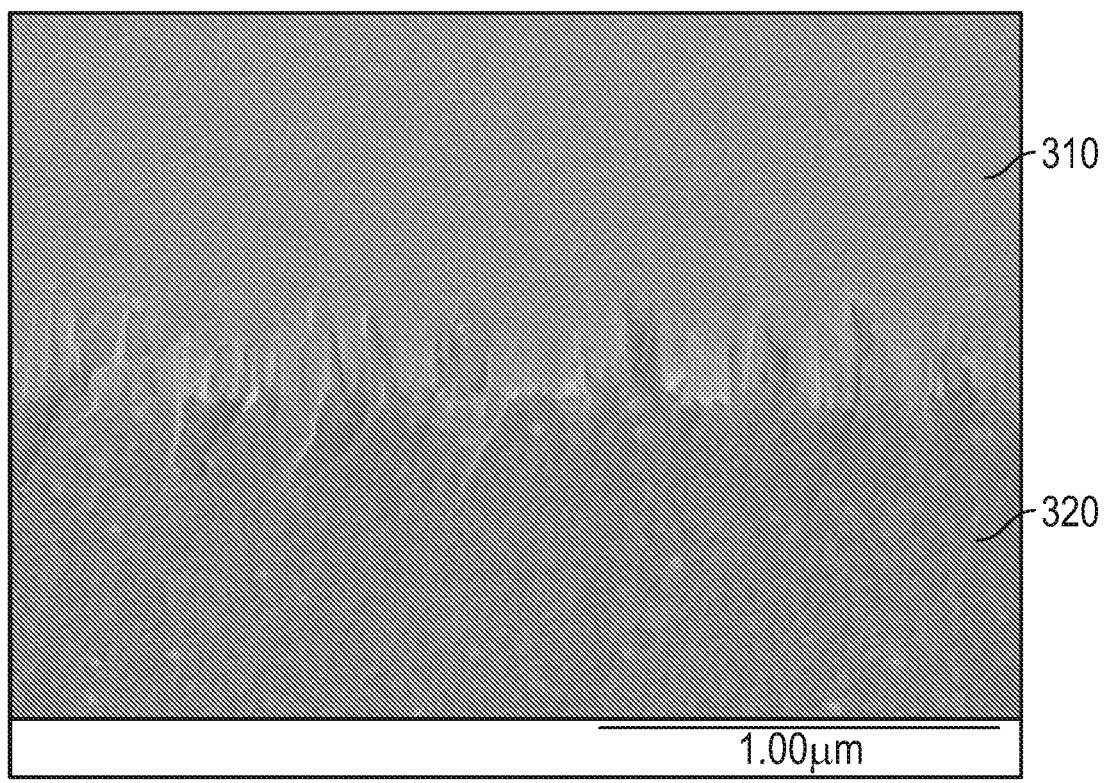
FIG. 3c is an SEM image of a cross-section of an article according to the present application, in which the organic layer contains 4 wt. % silica nanoparticles.
Figure 3D:
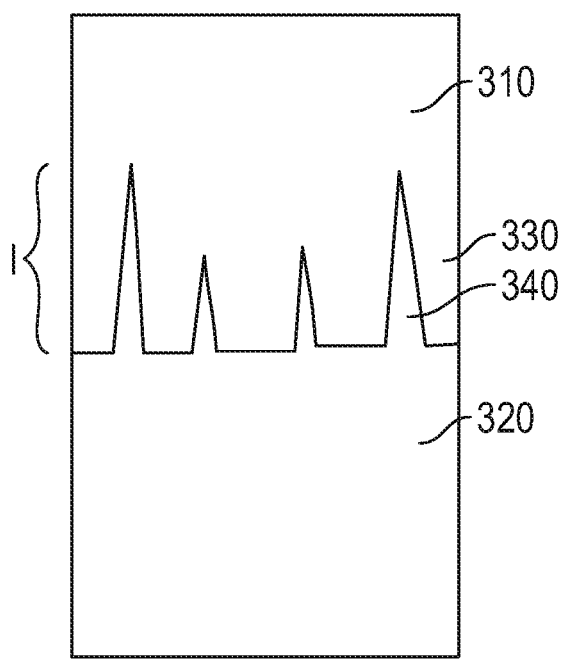
FIG. 3d is a schematic cross-sectional view of the article of FIG. 3c.

FIG. 3a is a scanning electron microscopy (SEM) image of a cross-section of an exemplary nanostructured organic layer (or first layer) containing 4 weight percent (wt. %) silica nanoparticles, in which the nanostructure was formed via reactive ion etching. Several nanofeature heights are indicated in FIG. 3a, including heights ranging from 186 nm to 256 nm. The organic layer comprised three monomers in the following ratio: 40% pentaerythritol tetraacrylate (SR295), 40% 1,6-hexanediol diacrylate (SR238), and 20% isobornyl acrylate (SR506). FIG. 3b is an SEM image of a top view of the nanostructured organic layer of FIG. 3a, which shows the space available for interpenetration by a ceramic layer (or second layer) upon deposition onto/into the nanostructured surface. FIG. 3c is an SEM image of a cross-section of an article according to the present application. The ceramic layer 310 comprises silica, prepared from perhydropolysilazane, interpenetrating the nanostructured organic layer 320. FIG. 3d is a schematic cross-sectional view of the article of FIG. 3c designed to illustrate the general structure of the interpenetrating region I of the organic layer 320 and the ceramic layer 310 when the organic layer has a (e.g., low) loading of silica nanoparticles of 4 wt. %. The majority of the material in the interpenetrated area is provided by the nanofeatures 330 of the ceramic layer (or second layer) 310 that fills the nanorecesses of the organic layer (or first layer), and a minority of the material is provided by the nanofeatures 340 of the organic layer (or first layer) 320.

Figure 4A:
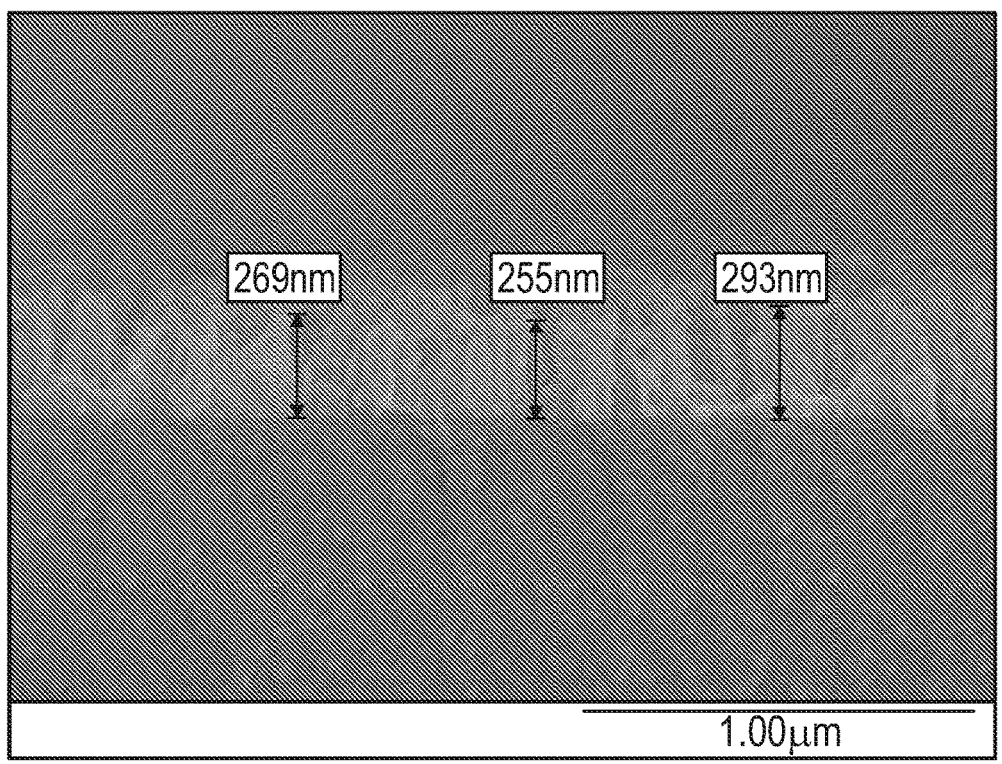
FIG. 4a is an SEM image of a cross-section of an exemplary nanostructured organic layer containing 15 weight percent (wt. %) silica nanoparticles, according to the present application.
Figure 4B:
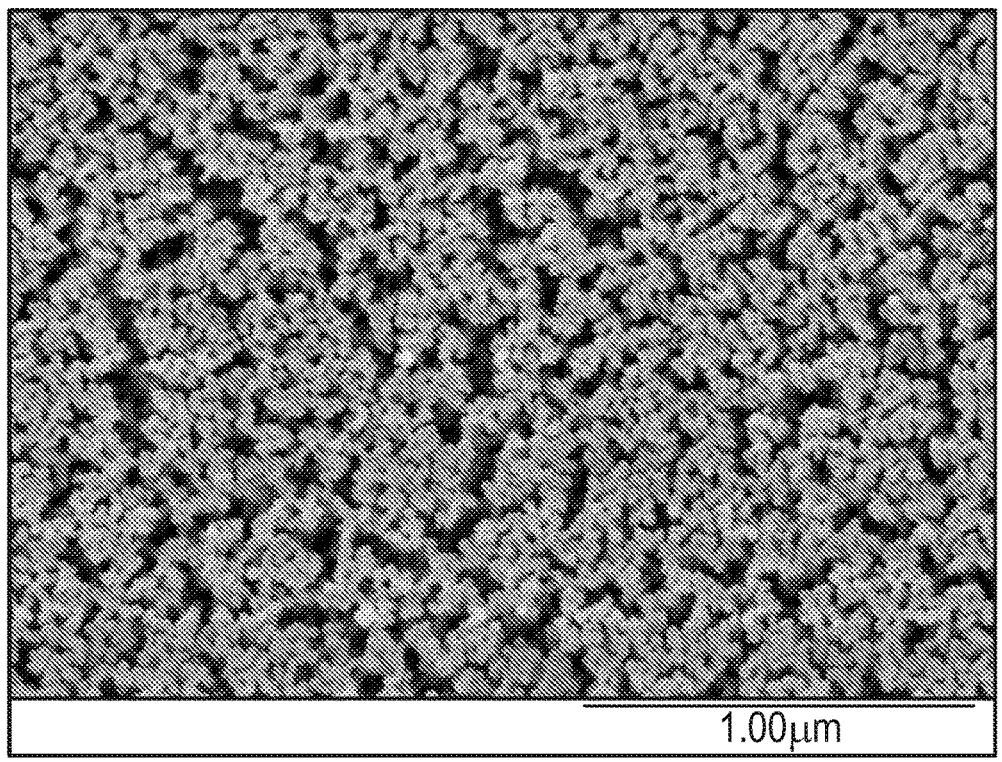
Figure 4C:
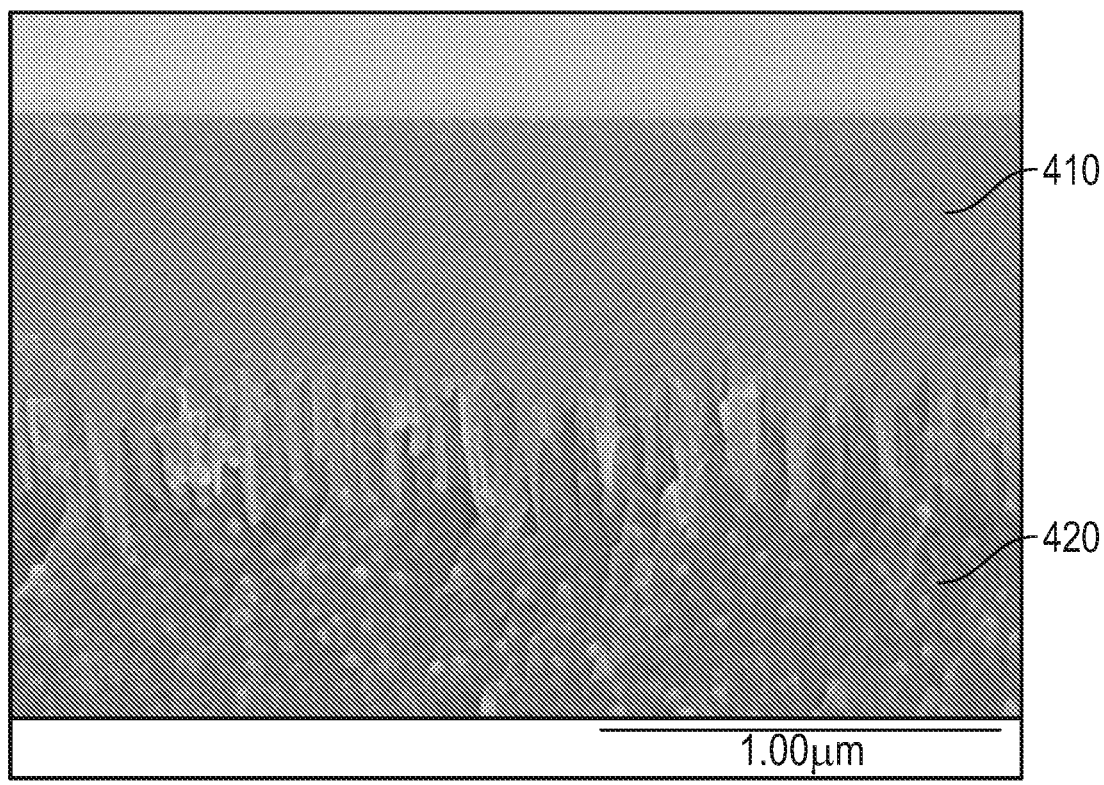
FIG. 4c is an SEM image of a cross-section of an article according to the present application, in which the organic layer contains 15 wt. % silica nanoparticles.
Figure 4D:
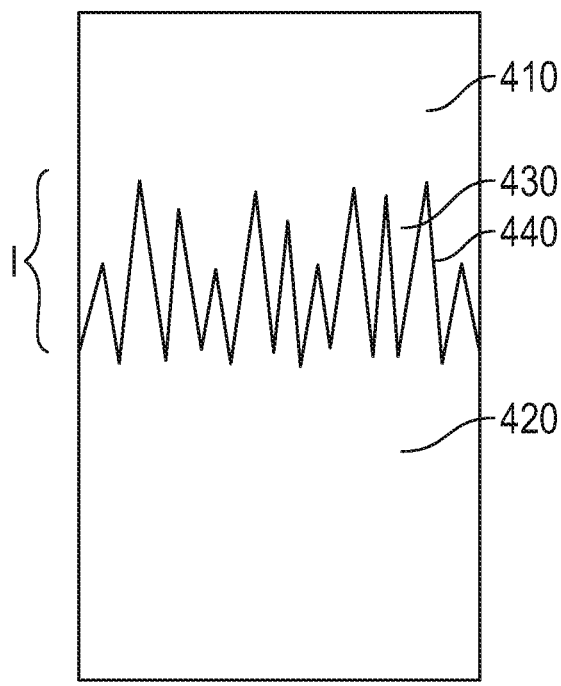
FIG. 4d is a schematic cross-sectional view of the article of FIG. 4c.

FIG. 4a is an SEM image of a cross-section of an exemplary nanostructured organic layer (or first layer) containing 15 wt. % silica nanoparticles, the nanostructure formed via reactive ion etching. Several nanofeature heights are indicated in FIG. 4a, including heights ranging from 255 nm to 293 nm. The organic layer had the same monomer composition as the organic layer of FIG. 3a. FIG. 4b is an SEM image of a top view of the nanostructured organic layer (or first layer) of FIG. 4a, which shows the space available for interpenetration by a ceramic layer (or second layer) upon deposition onto/into the nanostructured surface. FIG. 4c is an SEM image of a cross-section of an article according to the present application. The ceramic layer 410 comprises silica, prepared from perhydropolysilazane, interpenetrating the nanostructured organic layer 420. FIG. 4d is a schematic cross-sectional view of the article of FIG. 4c designed to illustrate the general structure of the interpenetrating region I of the organic layer (or first layer) 420 and the ceramic layer (or second layer) 410 when the organic layer (or first layer) has a (e.g., medium) loading of silica nanoparticles of 15 wt. %. The interpenetration is roughly equal in volume between the nanofeatures 440 of the organic layer (or first layer) 420 and the nanofeatures 430 of the ceramic layer (or second layer) 410.

Figure 5A:
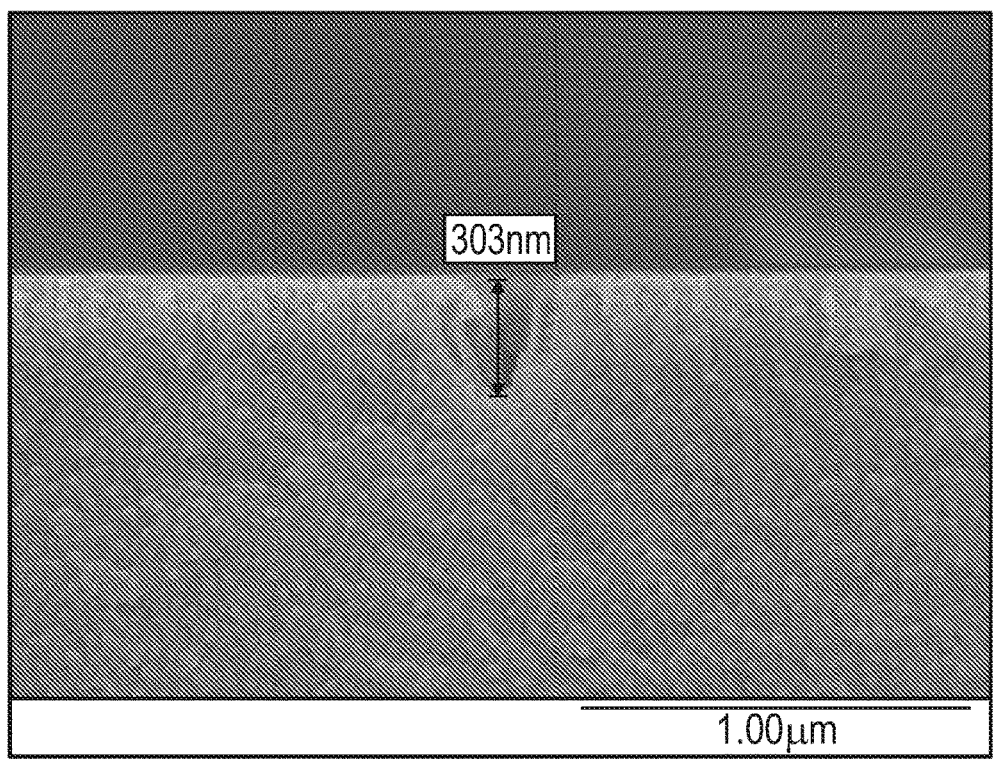
FIG. 5a is an SEM image of a cross-section of an exemplary nanostructured organic layer containing 50 weight percent (wt. %) silica nanoparticles, according to the present application.
Figure 5B:
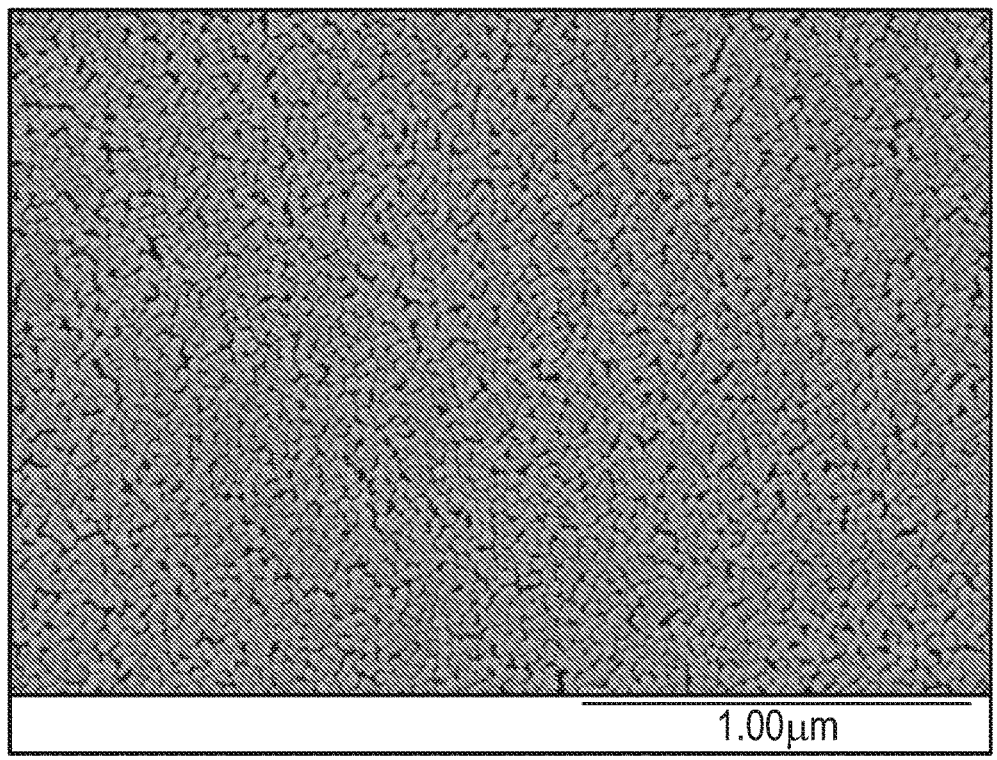
Figure 5C:
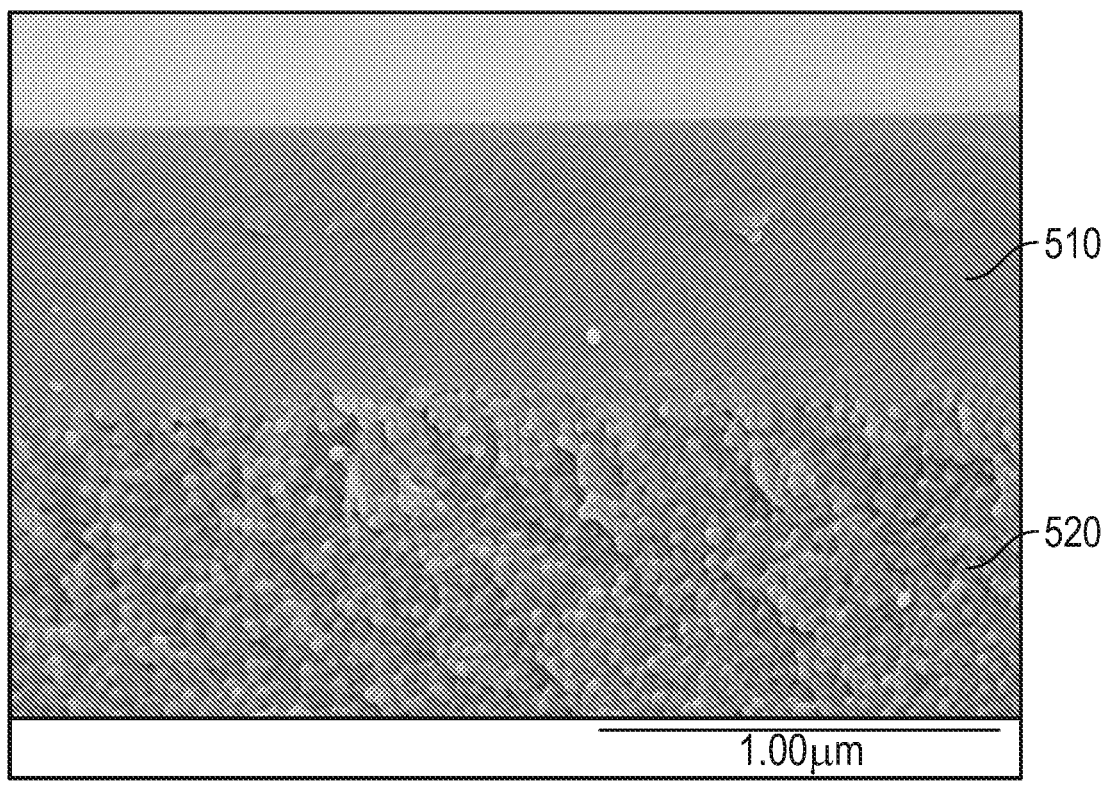
FIG. 5c is an SEM image of a cross-section of an article according to the present application, in which the organic layer contains 50 wt. % silica nanoparticles.
Figure 5D:
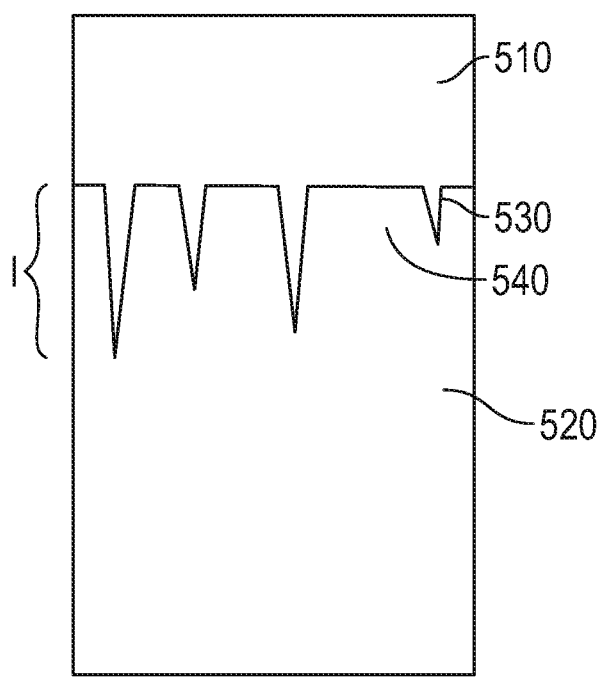
FIG. 5d is a schematic cross-sectional view of the article of FIG. 5c.

FIG. 5a is an SEM image of a cross-section of an exemplary nanostructured organic layer (or first layer) containing 50 weight percent (wt. %) silica nanoparticles, according to the present application. The organic layer had the same monomer composition as the organic layers of FIGS. 3a and 4a. FIG. 5b is an SEM image of a top view of the nanostructured organic layer (or first layer) of FIG. 5a, which shows the space available for interpenetration by a ceramic layer (or second layer) upon deposition onto/into the nanostructured surface. It is noted that the amount of space decreases with the increase in silica nanoparticle loading. FIG. 5c is an SEM image of a cross-section of an article according to the present application. The ceramic layer comprises silica, prepared from perhydropolysilazane, interpenetrating the nanostructured organic layer 520. FIG. 5d is a schematic cross-sectional view of the article of FIG. 5c designed to illustrate the general structure of the interpenetrating region of the organic layer (or first layer) 520 and the ceramic layer (or second layer) 510 when the organic layer has a (e.g., high) loading of silica nanoparticles of 50 wt. %. The majority of the material in the interpenetrated area is provided by the nanofeatures 540 of the organic layer (or first layer) 520 and a minority of the material is provided by the nanofeatures 530 of the ceramic layer (or second layer) 510.

In any embodiment, the organic layer (or the first layer) can comprise a polymeric matrix (i.e., a three-dimensionally continuous polymeric matrix). The polymeric material of the polymeric matrix is not particularly limited. Suitable polymeric materials include for instance and without limitation, a polymer selected from the group consisting of polycarbonate, polyethylene terephthalate (PET), poly(meth)acrylate, polyester, nylon, fluoropolymer, urethane, epoxy, cyclic olefin copolymer, triacetate cellulose, cellulose diacetate, and blends or copolymers thereof. These resins can be formed from the reaction product of polymerizable compositions comprising the corresponding monomers and or oligomers. As used in this document, the term (meth) acrylate means acrylate or methacrylate.

In some embodiments, a hardcoat composition comprises (e.g. solely) a crosslinking agent as the (meth)acrylate monomer comprising at least three (meth)acrylate functional groups. In some embodiments, the crosslinking monomer comprises at least four, five or six (meth)acrylate functional groups. Acrylate functional groups tend to be favored over (meth)acrylate functional groups. Preferred commercially available crosslinking agent include for example trimethylolpropane triacrylate (commercially available from Sartomer Company, Exton, PA, under the trade designation "SR351"), ethoxylated trimethylolpropane triacrylate (commercially available from Sartomer Company, under the trade designation "SR454"), pentaerythritol tetraacrylate, pentaerythritol triacrylate (commercially available from Sartomer Company under the trade designation "SR444"), dipentaerythritol pentaacrylate (commercially available from Sartomer Company under the trade designation "SR399"), ethoxylated pentaerythritol tetraacrylate, ethoxylated pentaerythritol triacrylate (commercially available from Sartomer under the trade designation "SR494"), dipentaerythritol hexaacrylate, and tris(2-hydroxy ethyl) isocyanurate triacrylate (commercially available from Sartomer under the trade designation "SR368").

Useful multi-(meth)acrylate monomers and oligomers include:
 (a) di(meth)acryl containing monomers such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, and tripropylene glycol diacrylate;
 (b) tri(meth)acryl containing monomers such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, and tris(2-hydroxyethyl)isocyanurate triacrylate; and
 (c) higher functionality (meth)acryl containin monomer such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate.

In one embodiment, the polymerizable compositions include at least one monomeric or oligomeric (meth)acrylate, preferably a urethane (meth)acrylate. Typically, the monomeric or oligomeric (meth)acrylate is multi(meth) acrylate. The term "(meth)acrylate" is used to designate esters of acrylic and methacrylic acids, and "multi(meth) acrylate" designates a molecule containing more than one (meth)acrylate group, as opposed to "poly(meth)acrylate" which commonly designates (meth)acrylate polymers. Most often, the multi(meth)acrylate is a di(meth)acrylate, but it is also contemplated to employ tri(meth)acrylates, tetra(meth) acrylates and so on. Suitable monomeric or oligomeric (meth)acrylates include alkyl (meth)acrylates such as methyl acrylate, ethyl acrylate, 1-propyl acrylate, methyl methacrylate and t-butyl acrylate. The acrylates may include (fluoro)alkylester monomers of (meth)acrylic acid, the monomers being partially and or fully fluorinated, such as, trifluoroethyl (meth)acrylate.

Examples of commercially available multi(meth)acrylate resins include the DIABEAM series from Mitsubishi Rayon Co., LTD.; the DINACOL series from Nagase & Company, Ltd.; the NK ESTER series from Shin-Nakamura Chemical Co., Ltd.; the UNIDIC series from Dainippon Ink & Chemicals, Inc., the ARONIX series from Toagosei Co., LTD.; the BLENMER series manufactured by NOF Corp.; the KAYARAD series from Nippon Kayaku Co., Ltd., the LIGHT ESTER series and LIGHT ACRYLATE series from Kyoeisha Chemical Co., Ltd.

Oligomeric urethane multi(meth)acrylates may be obtained commercially, for example from IGM Resins under the trade designation "Photomer 6000 Series", such as "Photomer 6010" and "Photomer 6020", and also from Sartomer Company under the trade designation "CN 900 Series", such as "CN966B85", "CN964" and "CN972". Oligomeric urethane (meth)acrylates are also available from Surface Specialties, such as available under the trade designations "Ebecryl 8402", "Ebecryl 8807" and "Ebecryl 4827". Oligomeric urethane (meth)acrylates may also be prepared by the initial reaction of an alkylene or aromatic diisocyanate of the formula OCN-R3-NCO with a polyol. Most often, the polyol is a diol of the formula HO-R4-OH wherein R3 is a C2-100 alkylene or an arylene group and R4 is a C2-100 alkylene group. Alkylene and arylene groups may include ether or ester groups. The intermediate product is then a urethane diol diisocyanate, which subsequently can undergo reaction with a hydroxyalkyl (meth)acrylate. Suitable diisocyanates include 2,2,4-trimethylhexylene diisocyanate and toluene diisocyanate. Alkylene diisocyanates are generally preferred. A particularly preferred compound of this type may be prepared from hexane diisocyanate, poly(caprolactone)diol and 2-hydroxyethyl methacrylate. In at least some cases, the urethane (meth)acrylate is preferably aliphatic.

The polymerizable compositions can be mixtures of various monomers and or oligomers, having the same or differing reactive functional groups. Polymerizable compositions comprising two or more different functional groups may be used, including the following; (meth)acrylate, epoxy and urethane. The differing functionality may be contained in different monomeric and or oligomeric moieties or in the same monomeric and or oligomeric moiety. For example, a resin composition may comprise an acrylic or urethane resin having an epoxy group and or a hydroxyl group in the side chain, a compound having an amino group and, optionally, a silane compound having an epoxy group or amino group in the molecule.

The compositions are polymerizable using conventional techniques such as thermal cure, photocure (cure by actinic radiation) and or e-beam cure. In one embodiment, the composition is photopolymerized by exposing it to ultraviolet (UV) and or visible light. Conventional curatives and or catalyst may be used in the polymerizable compositions and are selected based on the functional group(s) in the composition. Multiple curatives and or catalysts may be required if multiple cure functionality is being used. Combining one or more cure techniques, such as thermal cure, photocure and e-beam cure, is within the scope of the present disclosure.

Furthermore, the polymerizable compositions can comprise at least one other monomer and or oligomer (that is, other than those described above, namely the monomeric or oligomeric (meth)acrylate and the oligomeric urethane (meth)acrylate). This other monomer may reduce viscosity and/or improve thermomechanical properties and/or increase refractive index. Monomers having these properties include acrylic monomers (that is, acrylate and methacrylate esters, acrylamides and methacrylamides), styrene monomers and ethylenically unsaturated nitrogen heterocycles.

Also included are (meth)acrylate esters having other functionality. Compounds of this type are illustrated by the 2-(N-butylcarbamyl)ethyl (meth)acrylates, 2,4-dichlorophenyl acrylate, 2,4,6-tribromophenyl acrylate, tribromophenoxylethyl acrylate, t-butylphenyl acrylate, phenyl acrylate, phenyl thioacrylate, phenylthioethyl acrylate, alkoxylated phenyl acrylate, isobornyl acrylate and phenoxyethyl acrylate. The reaction product of tetrabromobisphenol A diepoxide and (meth)acrylic acid is also suitable. The other monomer may also be a monomeric N-substituted or N,N-disubstituted (meth)acrylamide, especially an acrylamide. These include N-alkylacrylamides and N,N-dialkylacrylamides, especially those containing C1-4 alkyl groups. Examples are N-isopropylacrylamide, N-t-butylacrylamide, N,N-dimethylacrylamide and N,N-diethylacrylamide. The term "(meth)acrylamide" means acrylamide and methacrylamide.

Styrenic compounds suitable for use as the other monomer include styrene, dichlorostyrene, 2,4,6-trichlorostyrene, 2,4,6-tribromostyrene, 4-methylstyrene and 4-phenoxystyrene. Ethylenically unsaturated nitrogen heterocycles include N-vinylpyrrolidone and vinylpyridine.

Commercially available liquid-resin based materials (typically referred to as "hardcoats") may be used as the polymeric matrix or as a component of the matrix. Such materials include the PERMANEW series from California Hardcoating Co., San Diego, Calif. and the UVHC series hardcoats from Momentive Performance Materials, Albany, N.Y. Additionally, a commercially available nanoparticle filled matrix may be used, such as NANOCRYL and NANOPDX from Nanoresins AG, Geesthacht Germany.

Additionally, nanoparticulate containing hardcoat films, such as THS series from Toray Advanced Films Co., Ltd., Tokyo, Japan; the Opteria Hardcoated Films for FPD from Lintec Corp., Tokyo, Japan; the Sony Optical Film from Sony Chemical & Device Corp., Tokyo, JP; the Hardcoated Film from SKC Haas, Seoul, Korea and the Terrappin G film from Tekra Corp., Milwaukee, Wis., may be used in this disclosure.

Surface leveling agents may be added to the polymeric matrix. The leveling agent is preferably used for smoothing the matrix resin. Examples include silicone-leveling agents, acrylic-leveling agents and fluorine-containing-leveling agents. In one embodiment, the silicone-leveling agent includes a polydimethyl siloxane backbone to which polyoxyalkylene groups are added.

A dispersed phase (e.g., a nanoparticle dispersed phase) is a discontinuous phase dispersed (e.g., randomly) within the polymeric matrix. The nanoscale dispersed phase can comprise nanoparticles (for example, nanospheres), nanotubes, or nanofibers. Preferably, the dispersed phase comprises nanoparticles. Nanoparticles as the dispersed phase in a composite material suitable, for instance, for reactive ion etching, preferably have a (e.g., number average) mean diameter in the range from about 1 nm to about 400 nm, in some embodiments in the range from about 5 nm to 200 nm. In some embodiments, the nanoparticles have a mean diameter in the range from about 10 to 150 nm. In some embodiments, the nanoparticles have a mean diameter in the range from about 15 to 100 nm. In some embodiments, the nanoparticles have a mean diameter of 5 nm, 20 nm, or 75 nm. The mean diameter can be determined using tunneling electron microscopy (TEM). Nanoparticles for the dispersed phase preferably comprise metal oxides, carbides, nitrides, borides, halides, fluorocarbon solids, or the like, or mixtures thereof. Preferred materials include $SiO_2$, $ZrO_2$, $TiO_2$, ZnO, $Al_2O_3$, calcium carbonate, magnesium silicate, indium tin oxide, antimony tin oxide, tungsten oxide, tungsten bronze, diamond, and any combination thereof. Preferably, the nanoparticles comprise $SiO_2$.

Nanoparticles can be present in the organic layer (or the first layer) in an amount from 1% to 60% by volume, 2% to 40% by volume, or from 3% to 30% by volume, as noted above. The relative contents of the matrix phase and the dispersed phase in a composite material can be expressed in volume percent or in weight percent, as is known in the art. Conversion of weight percent composition descriptions to volume percent composition descriptions requires an accounting for the density of each of the phases, as is readily done by those of ordinary skill in the art. Note that compositions of composite materials are described herein in terms of the relative contents of the solid material phases only, with no accounting for the possibility of pores (open or closed). It is within the scope of the compositions of composites described herein for there also to be pores present. The expressions herein of the compositions of composites are limited to description of only the solid phases contained in the composite, but there may also be pores present.

Silica particles for use in the materials of the present disclosure are commercially available from Nalco Chemical Co., Naperville, Ill. under the trade designation "Nalco Colloidal Silicas" such as products 1040, 1042, 1050, 1060, 2327 and 2329. Suitable fumed silicas include for example, products commercially available from Evonik under the trade designation, "Aerosil series OX-50", as well as product numbers -130, -150, and -200. Other colloidal silica can be also obtained from Nissan Chemicals under the designations "IPA-ST", "IPA-ST-L", and "IPA-ST-ML". Fumed silicas are also commercially available from Cabot Corp., Tuscola, Ill., under the designations "CAB—O-SPERSE 2095", "CAB—O-SPERSE A105", and "CAB-O-SIL M5". Zirconia particles for use in composition and articles of the invention are available from Nalco Chemical Co. under the trade designation "NALCO OOSSOO8".

Surface-treating the nano-sized particles can provide a stable dispersion in the polymeric matrix. Preferably, the surface-treatment stabilizes the nanoparticles so that the particles will be well dispersed in the polymerizable matrix and result in a substantially homogeneous composition. Furthermore, the nanoparticles can be modified over at least a portion of its surface with a surface treatment agent so that the stabilized particles can copolymerize or react with the polymerizable resin during curing.

The nanoparticles are preferably treated with a surface treatment agent. In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particles or nanoparticle surface before incorporation into the resins. The required amount of surface modifier is dependent on several factors such as particle size, particle type, molecular weight of the modifier, and modifier type.

Representative embodiments of surface treatment agents include compounds such as, for example, isooctyl trimethoxy-silane, N-(3-triethoxysilylpropyl)methoxyethoxy-ethoxyethyl carbamate (PEG3TES), N-(3-triethoxysilylpropyl)methoxyethoxyethyl carbamate (PEG2TES), 3-(methacryloyloxy)propyltrimethoxysilane, 3-acryloxy-propyltrimethoxysilane, 3-(methacryloyloxy)propyltri-ethoxysilane, 3-(methacryloyloxy)propylmethyldimethox-ysilane, 3-(acryloyloxypropyl)methyldimethoxysilane, 3-(methacryloyloxy)propyldimethylethoxysilane, vinyldim-ethylethoxysilane, pheyltrimethaoxysilane, n-octylt-rimethoxysilane, dodecyltrimethoxysilane, octadecylt-rimethoxysilane, propyltrimethoxysilane, hexyltrimethoxysilane, vinylmethyldiactoxysilane, vinylm-ethyldiethoxysilane, vinyltriacetoxysilane, vinyltriethoxysi-lane, vinyltriisopropoxysilane, vinyltrimethoxysilane, vinyl-triphenoxysilane, vinyltri-t-butoxysilane, vinyltris-isobutoxysilane, vinyltriisopropenoxysilane, vinyltris(2-methoxyethoxy)silane, styrylethyltrimethoxysilane, mere aptopropyltrimethoxysilane, 3-glycidoxypropyltrimethox-ysilane, acrylic acid, methacrylic acid, oleic acid, stearic acid, dodecanoic acid, 2-(2-(2-methoxyethoxy)ethoxy)ace-tic acid (MEEAA), beta-carboxyethylacrylate, 2-(2-methoxyethoxy)acetic acid, methoxyphenyl acetic acid, and mixtures thereof. Furthermore, a proprietary silane surface modifier, commercially available from OSI Specialties, Crompton South Charleston, W. Va., under the trade designation "SILQUEST A1230" is also suitable.

The surface modification of the particles in the colloidal dispersion can be accomplished in a variety of ways. The process involves the mixture of an inorganic dispersion with surface modifying agents. Optionally, a co-solvent can be added at this point, such as for examples, 1-methoxy-2-propanol, ethanol, isopropanol, ethylene glycol, N,N-dim-ethylacetamide and 1-methyl-2-pyrrolidinone. The co-solvent can enhance the solubility of the surface modifying agents as well as the surface modified particles. The mixture comprising the inorganic sol and surface modifying agents is subsequently reacted at room or an elevated temperature, with or without mixing. In one method, the mixture can be reacted at about 85° C. for about 24 hours, resulting in the surface modified sol. In another method, where metal oxides are surface modified the surface treatment of the metal oxide can preferably involve the adsorption of acidic molecules to the particle surface. The surface modification of the heavy metal oxide preferably takes place at room temperature.

The surface modification of $ZrO_2$ with silanes can be accomplished under acidic conditions or basic conditions. In one case the silanes are heated under acid conditions for a suitable period of time. At which time the dispersion is combined with aqueous ammonia (or other base). This method allows removal of the acid counter ion from the $ZrO_2$ surface as well as reaction with the silane. In another method the particles are precipitated from the dispersion and separated from the liquid phase.

A combination of surface modifying agents can be useful, wherein at least one of the agents has a functional group co-polymerizable with a hardenable resin. For example, the polymerizing group can be ethylenically unsaturated or a cyclic function subject to ring opening polymerization. An ethylenically unsaturated polymerizing group can be, for example, an acrylate or methacrylate, or vinyl group. A cyclic functional group subject to ring opening polymerization generally contains a heteroatom such as oxygen, sulfur or nitrogen, and preferably a 3-membered ring containing oxygen such as an epoxide.

In certain embodiments, reactive ion etching includes deposition of a gaseous species to mask a plurality of portions of the first surface of the organic layer, wherein the first surface of the organic layer is etched between the masked portions. In reactive ion etching, the use of gaseous species to form a mask can advantageously provide smaller distances (e.g., domains) between nanofeatures than achieved with the use of nanoparticles because the gaseous species can more readily form smaller masked portions than the average diameter of suitable nanoparticles.

Figure 7:
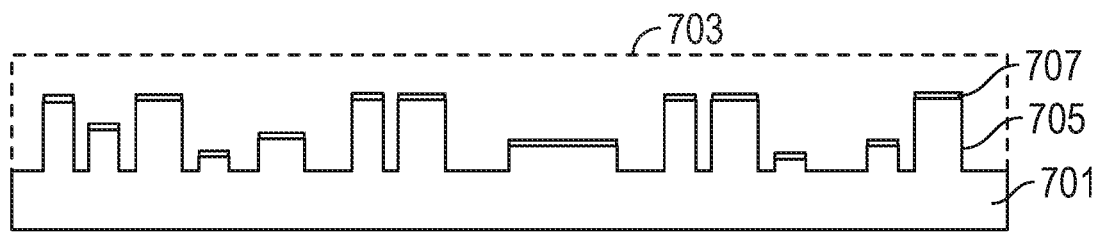
FIG. 7 is a schematic cross-sectional view of an exemplary organic layer including a mask on portions of the nanostructured surface, according to the present application.

Referring to FIG. 7, a schematic cross-sectional view of an exemplary organic layer (or first layer) including a mask on portions of the nanostructured surface, according to the present application. More particularly, FIG. 7 is an illustration of an article after having been treated with a plasma including first and second gaseous species. The first gaseous species is capable of depositing a layer onto the substrate when formed into a plasma and the second gaseous species is capable of etching the substrate when formed into a plasma. The second gaseous species has etched a major surface 703 (the original surface is shown in phantom), leaving nanostructures 705 of diverse height and aspect ratio. At least portions of the etched surface 703 have a layer 707 deposited upon them via a first gaseous species, typically the highest parts of the nanostructures 705. In many convenient embodiments, the layer of the deposited species is present over all of the etched surface with a concentration that varies continuously according to the depth from the major surface 703.

The gaseous species are often selected from the group consisting of organosilicons, metal alkyls, metal alkoxides, metal beta-diketonates and metal halides. Typically, the organosilicon compounds can include tetramethylsilane, trimethylsilane, hexamethyldisiloxane, tetraethylorthosilicate, or a polyhedral oligomeric silsesquioxane. Useful metal alkyls can comprise trimethylaluminum, tributylaluminum, tributyltin, or tetramethyl gallium. Useful metal alkoxides can comprise tetra(methoxy) titanate, tetra (ethoxy) titanate, tetra(isopropoxy) titanate, tetra(n-propoxy)titanate, tetra(butoxy) titanate, 2-ethylhexyloxy titanate, octylene glycol titanate, poly(n-butoxy) titanate, triethanolamine titanate, n-butyl zirconate, n-propyl zirconate, titanium acetyl acetonate, ethyl acetoacetic ester titanate, isostearoyl titanate, titanium lactate, zirconium lactate, zirconium glycolate, methyltriacetoxy silane, tetra(n-propoxy) zirconate, aluminum tri-sec-butoxide, and mixtures thereof. Additional examples include vaporizable prepolymerized forms of the above metal alkoxides including dimers, trimers, and longer oligomers including polydimethoxysiloxane and polybutyl titanate. Useful metal beta-diketonates can comprise Pt(II) bis(2,4-pentanedionate), Pt(II) bis(2,4-hexanedionate), Pt(II) bis(2,4-heptanedionate), Pt(II) bis(3,5-heptanedionate), Pt(II) bis(1-phenyl-1,3-butanedionate), or Pt(II) bis(1,3-diphenyl-1,3-propanedionate). Useful metal halides can comprise titanium tetrachloride, or silicon tetrachloride. A surprising aspect of the disclosure is that the etching and the deposition can be performed simultaneously, that the etching by the second gaseous species does not also remove the deposition by the first gaseous species.

Plasma chemical vapor deposition (or plasma-enhanced chemical vapor deposition) is a process by which plasmas, typically generated by radio-frequency discharge, are formed in the space between two electrodes when that space is filled with a reacting gas or gases. Plasma chemical vapor deposition is done under vacuum to reduce side reactions from unwanted species being present in the reacting chamber. The reacting gas or gases typically deposit thin solid films on a substrate. In some methods, the first gaseous species forms a layer on the substrate using plasma chemical vapor deposition simultaneously with the etching. In some embodiments, the etching results in a surface with areas of random depth in the direction normal to the original exposed surface. The provided method includes etching portions of the major surface to form a nanostructure on the substrate while simultaneously depositing a layer on the etched surface. Typically, reactive ion etching is used for the etching.

In one embodiment, the provided method can be carried out using a continuous roll-to-roll process referred to as "cylindrical reactive ion etching" (cylindrical RIE). Cylindrical RIE utilizes a rotating cylindrical electrode to provide etched nanostructures on the surface of a substrate or article. In many convenient embodiments, the etching results nanostructures etched to different depths from the original surface. In general, cylindrical RIE can be described as follows. A rotatable cylindrical electrode ("drum electrode") powered by radio-frequency (RF) and a grounded counter-electrode are provided inside a vacuum vessel. The counter-electrode can comprise the vacuum vessel itself An etchant gas is fed into the vacuum vessel, and a plasma is ignited and sustained between the drum electrode and the grounded counter-electrode. A useful cylindrical RIE apparatus is described, for example, in US Application Publication No. 2017/0067150 (David et al.).

A continuous substrate comprising a random, discontinuous masking layer can then be wrapped around the circumference of the drum and the substrate can be etched in the direction normal to the plane of the substrate. The exposure time of the substrate can be controlled to obtain a predetermined etch depth of the resulting nanostructure. The process can be carried out at an operating pressure of approximately 10 mTorr. Cylindrical RIE is disclosed, for example, in PCT Application Publication No. WO 2010/078306 (David et al.).

The nanostructured articles of the disclosure may have a nanostructure that is anisotropic. The nanostructured anisotropic surface typically comprises nanofeatures having a height to width ratio of about 2:1 or greater; preferably about 5:1 or greater. In some embodiments, the height to width ratio is even 50:1 or greater, 100:1 or greater, or 200:1 or greater. In some embodiments, the majority of the nanofeatures are capped with dispersed phase material. The concentration of the dispersed phase at the surface (versus in the interior of the matrix) can be between about 1 volume % and about 60 volume %; preferably between about 5 volume % and about 20 volume %. In some embodiments, the concentration of the dispersed phase is higher at the surface of the matrix than within the matrix. The nanostructured surface in some embodiments exhibits a specular reflectance of from 0.05% to 1%, in some cases from 0.05% to 0.35%, for instance as measured using a BYK Gardiner Color-Guide Sphere at a 10 degree incident angle for the wavelength range of 400 to 700 nm. The nanostructured surface typically exhibits a transmitted haze (as measured using a Haze-Gard Plus (BYK-Gardner, Columbia, Md.) of from 0.1 to 1, in some cases from 0.1 to 0.4.

In certain embodiments, the organic layer comprises a polymeric film. A polymeric "film" is a polymer material in the form of a generally flat sheet that is sufficiently flexible and strong to be processed in a roll-to-roll fashion. Polymeric films used in articles described herein are sometimes referred to as base films. By roll-to-roll, what is meant is a process where material is wound onto or unwound from a support, as well as further processed in some way. Examples of further processes include coating, slitting, blanking, and exposing to radiation, or the like. Polymeric films can be manufactured in a variety of thicknesses, ranging in general from about 5 micrometers to 1000 micrometers.

In certain embodiments, such as the article 150 depicted in FIG. 1, a plurality of particles 158 is distributed in a polymeric matrix of the organic layer 151. Typically, the particles are present in the organic layer in a concentration of 1 to 60 volume percent, 2 to 40 volume percent, or 3 to 30 volume percent, of the total volume of the organic layer. In some embodiments, the particles may be present in the organic layer in an amount of 1 volume percent (vol. %) or greater, 2 vol. % or greater, 3 vol. % or greater, 5 vol. % or greater, 7 vol. % or greater, 10 vol. % or greater, 12 vol. % or greater, or 15 vol. % or greater; 60 vol. % or less, 55 vol. % or less, 50 vol. % or less, 45 vol. % or less, 40 vol. % or less, 35 vol. % or less, 30 vol. % or less, or 25 vol. % or less; and 2 to 40 vol. %, 3 to 30 vol. %, or 4 to 25 vol. %.

Suitable nanoparticles of the polymeric matrix of the organic layer can have an average primary or agglomerate particle size diameter of between 5 nanometers (nm) and 500 nm or 10 nm to 200 nm. The average particle size of the nanoparticles of the organic layer can be measured using transmission electron microscopy or scanning electron microscopy, for example. "Agglomerate" refers to a weak association between primary particles which may be held together by charge or polarity and can be broken down into smaller entities. "Primary particle size" refers to the mean diameter of a single (non-aggregate, non-agglomerate) particle. As used herein "aggregate" with respect to particles refers to strongly bonded or fused particles where the resulting external surface area may be significantly smaller than the sum of calculated surface areas of the individual components. The forces holding an aggregate together are strong forces, for example covalent bonds, or those resulting from sintering or complex physical entanglement. Although agglomerated nanoparticles can be broken down into smaller entities such as discrete primary particles such as by application of a surface treatment; the application of a surface treatment to an aggregate simply results in a surface treated aggregate. In some embodiments, a majority of the nanoparticles (i.e., at least 50%) are present as discrete unagglomerated nanoparticles in the coating suspensions. For example, in some embodiments, at least 70%, 80% or 90% of the nanoparticles can be present as discrete unagglomerated nanoparticles. The concentration of nanoparticles can be determined by methods known in the art, such as thermogravimetric analysis.

In some embodiments, the particles comprise microparticles, such as microparticles having an average diameter of greater than 500 nm to 50 micrometers, 1 micrometer to 50 micrometers, 5 micrometers to 50 micrometers, greater than 500 nm to 10 micrometers, 1 micrometer to 20 micrometers, or 25 micrometers to 50 micrometers. For instance and without limitation, the microparticles may comprise resin, $SiO_2$, $ZrO_2$, $TiO_2$, ZnO, $Al_2O_3$, calcium carbonate, magnesium silicate, indium tin oxide, antimony tin oxide, tungsten oxide, tungsten bronze, or combinations thereof. When the particles comprise microparticles of resin, suitable resins may be selected from the group consisting of polymethyl methacrylate beads, polycarbonate beads, polystyrene beads, polyacryl-styrene beads, polyvinyl chloride beads, and combinations thereof. Microparticles may be included in the organic layer to provide a particular function, such as helping to impart anti-glare properties to the article.

Typically, the ceramic layer comprises a ceramic material selected from the group consisting of silicon dioxide, silicon carbide, silicon oxycarbide, silicon nitride, silicon oxynitride, aluminum oxide, titanium oxide, zirconium oxide, stabilized zirconium oxide, diamond, diamond-like carbon, diamond-like glass, or any combination thereof. In certain cases, these materials are deposited from the vapor phase using techniques such as sputtering, reactive sputtering, plasma-enhanced chemical vapor deposition (PECVD), atomic layer deposition (ALD), chemical vapor deposition (CVD), ion-assisted plasma chemical deposition, ion-beam deposition, cathodic arc deposition, etc. The ceramic layer may comprise a ceramic material that is amorphous. The ceramic layer may comprise a ceramic material that is at least partially crystalline. The term "diamond-like carbon" (DLC) refers to an amorphous film or coating comprising approximately 50 to 90 atomic percent carbon and approximately 10 to 50 atomic percent hydrogen, with a gram atom density of between approximately 0.20 and approximately 0.28 gram atoms per cubic centimeter, and composed of approximately 50% to approximately 90% tetrahedral bonds. The term "diamond-like glass" (DLG) refers to substantially or completely amorphous glass including carbon and silicon, and optionally including one or more additional components selected from the group including hydrogen, nitrogen, oxygen, fluorine, sulfur, titanium, and copper. Other elements may be present in certain embodiments. The amorphous diamond-like glass films may contain clustering of atoms to give it a short-range order but are essentially devoid of medium and long range ordering that lead to micro or macro crystallinity that can adversely scatter radiation having wavelengths of from 180 nanometers (nm) to 800 nm.

Optionally, the ceramic layer (or second layer) comprises a surface functionalization, for example as described in U.S. Pat. No. 9,340,683 (Jing et al.), U.S. Pat. No. 9,527,336 (Mahli et al.), U.S. Pat. No. 7,226,651 (Hayashida et al.), or U.S. Patent Application Publication Number 2013/0164730 (Gustafson et al.). Suitable surface functionalizations include organosilane molecules, in some embodiments covalently attached to the ceramic layer. Examples of useful organosilane molecules include zwitterionic silanes.

In any embodiment, the ceramic layer has organic content of less than 50 percent by weight, 40 percent by weight, less than 25, less than 20, less than 15, less than 10, less than 5, less than 4, less than 3, less than 2, or less than 1 percent by weight. The organic content may be provided with the inclusion of one or more organically modified ceramics (e.g., inorganic-organic composites). For instance, sol-gel techniques may be used to prepare ceramics from inorganic precursor materials, followed by inclusion of organic components through interpenetration by a polymer and/or attachment of organic components through silicon-carbon bonds, coordinative bonds, or ionic bonds, such as described in "Organically Modified Ceramics and their Applications", Schmidt et al., Journal of Non-Crystalline Solids, vol. 121, 1990, pp. 428-435. Alternatively, inorganic-organic composites may be formed by sol-gel synthesis of an organometallic precursor, such as described in "Abrasion Resistant thin Partially Stabilised Zirconia Coatings by Sol-gel Dip-coating", Ivankovic et al., Chem. Biochem. Eng. Q, vol. 19, 2005, pp. 31-27. The organic content of the ceramic layer may also take the form of residual ligands or solvents, as may be present in a ceramic layer derived from a sol-gel process. For example, a molecular sol-gel process may yield a ceramic layer with residual alkoxy groups coordinating a metal or metalloid element in the layer. Alternatively, a ceramic layer derived from a colloidal sol-gel process may incorporate some amount of organic surface functional groups originally bound to the colloidal particles (e.g., nanoparticles) before formation of the layer from the colloidal dispersion (also referred to as a colloidal solution). In some embodiments, the organic functional groups bound to a molecular precursor (e.g., metalorganic compound, such as an organosilane) or to a colloidal particle (e.g., metal oxide nanoparticle, such as $SiO_2$ or $ZrO_2$) may be reactive with other species in the layer coating solution or dispersion, including reactive with others of itself in the solution or dispersion, for example as described in U.S. Patent Application Publication No. 2018/0044245 (Humpal et al.). Examples of such reactive functional groups include (meth) acrylate or epoxy functional groups.

In some embodiments according to the third, fourth, fifth or sixth aspects, the first layer can comprise a nanostructured polymeric film as described above, and the second layer can comprise a hardcoat composition or nanoparticulate containing hardcoat composition as described in detail above with respect to the organic (or first) layer, with the proviso that either a) the first layer has a first elastic storage modulus of between $1\times10^6$ and less than $1\times10^{10}$ pascals and the second layer has a second elastic storage modulus of between greater than $1\times10^{10}$ and $1.3\times10^{12}$ pascals, or b) the second layer has a second elastic storage modulus that is at least 1.5 times the first elastic storage modulus of the first layer. Hence, in some embodiments, both the first layer and the second layer can be organic layers, but the use of interpenetration of nanofeatures between the two layers is advantageous due to the mismatch of elastic properties between the materials of the two layers.

In some embodiments of the third, fourth, fifth, or sixth aspects, the first layer comprises a first ceramic material and second layer comprises a second ceramic material. The first ceramic material has a first elastic storage modulus and the second ceramic material has a second elastic storage modulus. Examples of the first ceramic material of such embodiments include hybrid organic-inorganic materials (e.g., organosiloxane, organically modified silica or silicate (OR-MOSIL)), xerogels, and glasses. Examples of the second ceramic material of such embodiments include silicon dioxide, silicon carbide, silicon oxycarbide, silicon nitride, silicon oxynitride, aluminum oxide, titanium oxide, zirconium oxide, stabilized zirconium oxide, diamond, diamond-like carbon, and diamond-like glass.

Figure 8A:
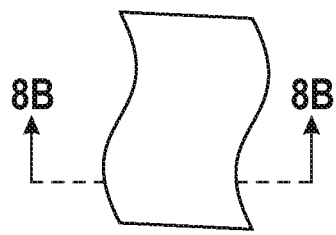
FIG. 8a is a schematic perspective view of an exemplary contoured article.
Figure 8B:
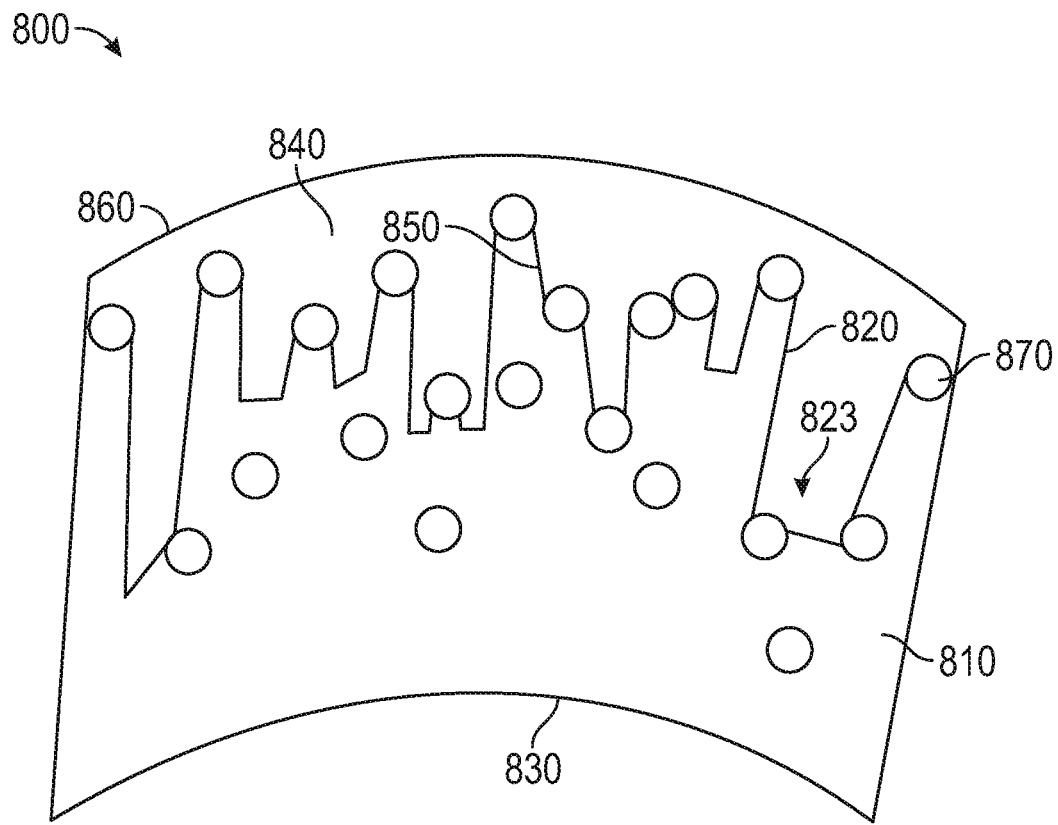

In many embodiments, the opposing second surface of the ceramic layer (or second layer) is substantially parallel to the opposing second surface of the organic layer (or first layer). For instance, in the embodiments of FIGS. 1 and 2, each of the opposing second surfaces is substantially planar; however, it is within the scope of the current disclosure that the article has a shape other than flat or planar. Referring to FIG. 8a, a schematic perspective view of an exemplary contoured article is provided. FIG. 8b is a schematic cross-sectional view of at least a portion 800 of the exemplary contoured article, taken along the line 8b-8b, of the contoured article of FIG. 8a. The at least a portion 800 of the contoured article comprises an organic layer (or first layer) 810 having a nanostructured first surface comprising nanofeatures 820 defining nanorecesses 823 and an opposing second surface 830; and a ceramic layer (or second layer) 840 disposed on the nanostructured first surface of the organic layer (or first layer) 810 and filling at least a portion of the nanorecesses 823, wherein the ceramic layer (or second layer) 840 has a nanostructured first surface comprising nanofeatures 850 and an opposing second surface 860.

The ceramic layer (or second layer) 840 has a thickness that is greater than the height of the tallest nanofeatures 820 (e.g., the ceramic layer (or second layer) is "overcoated" on the organic layer (or first layer)). In the embodiment of FIG. 8b, each of the opposing second surface of the organic layer 830 and the opposing second surface of the ceramic layer 860 are curved, and (substantially) parallel to each other. The nanofeatures 820 tend to follow the overall curvature of the organic layer 810, which in this case, is illustrated to include a plurality of nanoparticles 870.

Methods

Various methods may be employed according to the present disclosure to prepare the articles according to the first, third, and fifth aspects described above. More particularly, in a second aspect, a method of making an article is provided. The method comprises:
  a. obtaining an organic layer having a nanostructured first surface comprising nanofeatures defining nanorecesses and an opposing second surface; and
  b. filling at least a portion of the nanorecesses of the nanostructured first surface of the organic layer with a ceramic layer of a ceramic material to form the article, wherein the ceramic layer has a nanostructured first surface comprising nanofeatures and an opposing second surface, wherein the nanostructured first surface of the ceramic layer is interpenetrated with the nanostructured first surface of the organic layer.

In a fourth aspect, another method of making an article is provided. The method comprises:
  a. obtaining a first layer comprising a first material with a first elastic storage modulus of between $1 \times 10^6$ and less than $1 \times 10^{10}$ pascals and having a nanostructured first surface comprising nanofeatures defining nanorecesses and an opposing second surface; and
  b. filling at least a portion of the nanorecesses of the nanostructured first surface of the first layer with a second layer of a second material with a second elastic storage modulus of between greater than $1 \times 10^{10}$ and $1.3 \times 10^{12}$ pascals to form the article;
    wherein the second material is non-metallic; wherein the second layer has a nanostructured first surface comprising nanofeatures and an opposing second surface; and wherein the nanostructured first surface of the second layer is interpenetrated with the nanostructured first surface of the first layer.

In some embodiments, the first elastic storage modulus is $1 \times 10^6$ pascals or greater, $2 \times 10^6$ pascals or greater, $3 \times 10^6$ pascals or greater, $4 \times 10^6$ pascals or greater, $5 \times 10^6$ pascals or greater, $6 \times 10^6$ pascals or greater, $7 \times 10^6$ pascals or greater, $8 \times 10^6$ pascals or greater, $9 \times 10^6$ pascals or greater, $1 \times 10^7$ pascals or greater, $2 \times 10^7$ pascals or greater, $4 \times 10^7$ pascals or greater, $6 \times 10^7$ pascals or greater, $8 \times 10^7$ pascals or greater, $9.5 \times 10^7$ pascals or greater; and $9.5 \times 10^9$ pascals or less, $9 \times 10^9$ pascals or less, $8 \times 10^9$ pascals or less, $7 \times 10^9$ pascals or less, $6 \times 10^9$ pascals or less, $5 \times 10^9$ pascals or less, $4 \times 10^9$ pascals or less, $3 \times 10^9$ pascals or less, $2 \times 10^9$ pascals or less, $1 \times 10^9$ pascals or less, $9 \times 10^8$ pascals or less, $8 \times 10^8$ pascals or less, $6 \times 10^8$ pascals or less, $5 \times 10^8$ pascals or less, $3 \times 10^8$ pascals or less, or $2 \times 10^8$ pascals or less; or between $1 \times 10^6$ and $9.5 \times 10^9$ pascals, between $2.5 \times 10^6$ and $7.5 \times 10^9$ pascals, between $5 \times 10^6$ and $5 \times 10^9$ pascals, between $7.5 \times 10^6$ and $2.5 \times 10^9$ pascals, between $1 \times 10^7$ and $1 \times 10^9$ pascals, between $2.5 \times 10^7$ and $7.5 \times 10^8$ pascals, or between $5 \times 10^7$ and $5 \times 10^8$ pascals. In some embodiments, the second elastic storage modulus is $1.2 \times 10^{10}$ pascals or greater, $2 \times 10^{10}$ pascals or greater, $3 \times 10^{10}$ pascals or greater, $4 \times 10^{10}$ pascals or greater, $5 \times 10^{10}$ pascals or greater, $6 \times 10^{10}$ pascals or greater, $7 \times 10^{10}$ pascals or greater, $8 \times 10^{10}$ pascals or greater, $9 \times 10^{10}$ pascals or greater, $1 \times 10^{11}$ pascals or greater, or $1.5 \times 10^{11}$ pascals or greater; and $1.3 \times 10^{12}$ pascals or less, $1 \times 10^{12}$ pascals or less, $9.5 \times 10^{11}$ pascals or less, $9 \times 10^{11}$ pascals or less, $8.5 \times 10^{11}$ pascals or less, $8 \times 10^{11}$ pascals or less, $7.5 \times 10^{11}$ pascals or less, $7 \times 10^{11}$ pascals or less, $6 \times 10^{11}$ pascals or less, $5 \times 10^{11}$ pascals or less, $4 \times 10^{11}$ pascals or less, $3 \times 10^{11}$ pascals or less, or $2 \times 10^{11}$ pascals or less. In some embodiments, the first elastic storage modulus can be between $1 \times 10^6$ and $9.5 \times 10^9$ pascals and the second elastic storage modulus can be between $1.2 \times 10^{10}$ and $1.3 \times 10^{12}$ pascals; or the first elastic storage modulus can be between $1 \times 10^6$ and $7.5 \times 10^9$ pascals and the second elastic storage modulus can be between $2 \times 10^{10}$ and $1 \times 10^{12}$ pascals.

In a sixth aspect, a further method of making an article is provided. The method comprises:
  a. obtaining a first layer comprising a first material with a first elastic storage modulus and having a nanostructured first surface comprising nanofeatures defining nanorecesses and an opposing second surface; and
  b. filling at least a portion of the nanorecesses of the nanostructured first surface of the first layer with a second layer of a second material with a second elastic storage modulus to form the article;
    wherein the second layer has a nanostructured first surface and an opposing second surface; wherein the nanostructure first surface of the second layer is interpenetrated with the nanostructured first surface of the first layer, wherein the second material is non-metallic; and wherein the second elastic storage modulus is at least 1.5 times the first elastic storage modulus.

Preferably, the second elastic storage modulus is 1.5 times or more than the first elastic storage modulus, 2.0 times or more, 3.0 times or more, 5.0 times or more, 7.5 times or more, 10 times or more, or 12.5 times or more than the first elastic storage modulus.

As described above, in some embodiments, the nanostructured first surface of the organic layer is formed by reactive ion etching the organic layer. The ceramic layer can be deposited on the nanostructured first surface of the organic layer by any of a number of vapor phase deposition processes, grouped generally into chemical vapor deposition (CVD) and physical vapor deposition (PVD) methods. Useful CVD methods include, for example, atomic layer deposition (ALD), plasma enhanced CVD (PECVD), and atmospheric pressure CVD (APVCD). Useful PVD methods include, for example, sputter coating and evaporation coating. Many ceramic materials can be deposited using vapor deposition methods, including for example, silicon oxide, silicon oxycarbide, silicon oxynitride, aluminum oxide, zirconium oxide, and titanium oxide.

Figure 6:
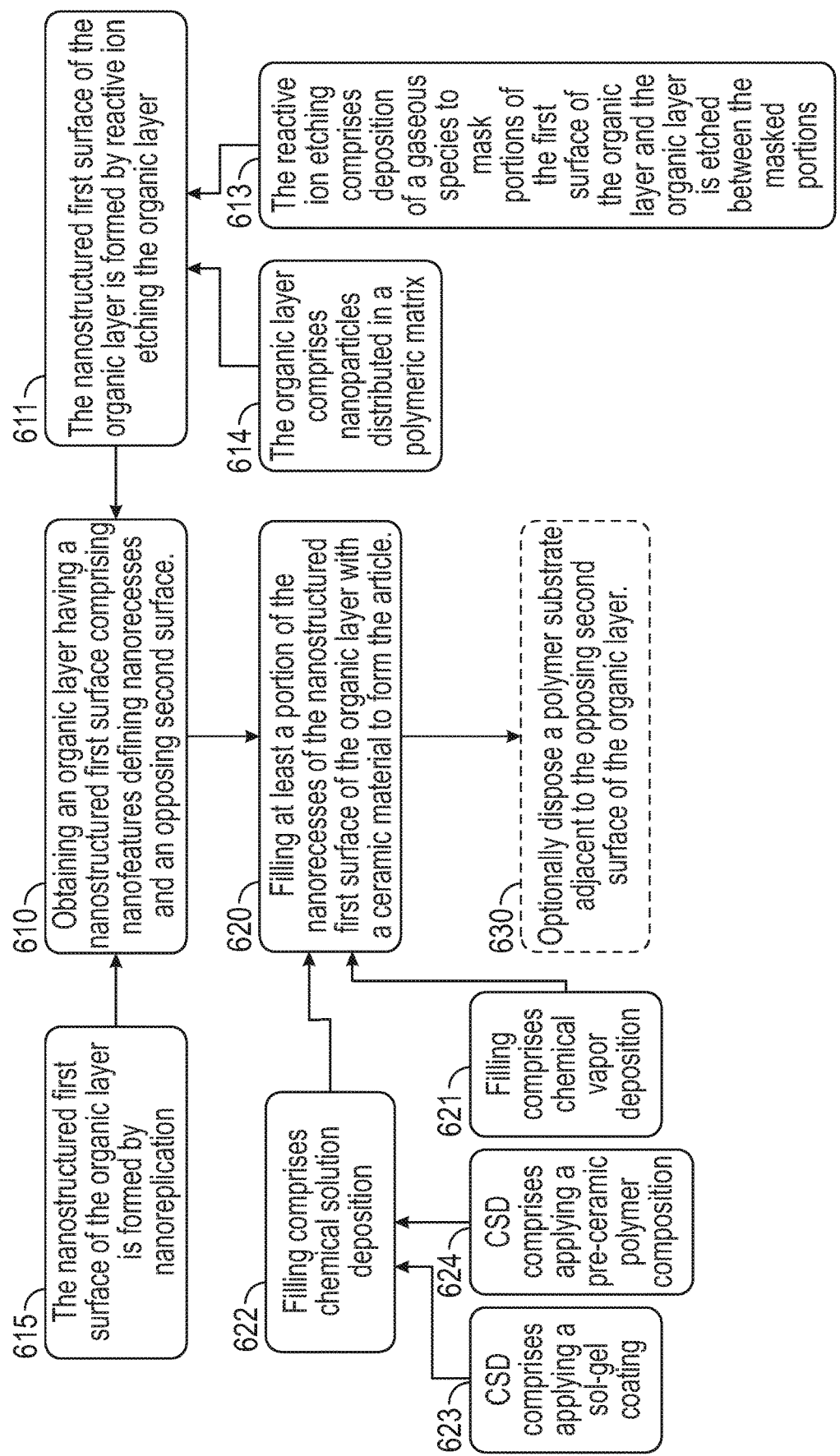
FIG. 6 is a flow chart of exemplary methods of making an article, according to the present application.

FIG. 6 is a flow chart of exemplary methods of making an article, according to the present application. Referring to FIG. 6, a method for making an article includes obtaining an organic layer (or first layer, not shown) having a nanostructured first surface comprising nanofeatures defining nanorecesses and an opposing second surface 610 and filling at least a portion of the nanorecesses of the nanostructured first surface of the organic layer with a ceramic material (or second material, not shown) to form the article 620. Optionally, the method further includes disposing a substrate (e.g., polymer, glass (not shown), or metal (not shown)) adjacent to the opposing second surface of the organic layer 630. A (e.g., polymer) substrate may be attached using an adhesive or tie layer, for instance, between the opposing second surface of the organic layer and the polymer substrate, or the organic layer may be formed on the polymer substrate prior to formation of the nanostructured surface of the organic layer by coating followed by curing and/or drying the organic layer onto a major surface of the polymer substrate (such as described below in the Examples).

In some embodiments, the nanostructured first surface of the organic layer is formed by nanoreplication 615, while in other embodiments nanostructured first surface of the organic layer is formed by reactive ion etching the organic layer 611. For reactive ion etching, it is possible that the organic layer comprises nanoparticles distributed in a polymeric matrix 614. It certain embodiments, the reactive ion etching comprises deposition of a gaseous species to mask portions of the first surface of the organic layer and the organic layer is etched between the masked portions 613. Reactive ion etching is discussed in greater detail above.

In some embodiments, the filling of at least a portion of the nanorecesses of the nanostructured first surface of the organic layer with a ceramic material comprises chemical vapor deposition (CVD) 621, while in other embodiments the filling comprises chemical solution deposition (CSD) 622. CSD typically is performed using a conventional process selected from dip coating, spin-coating, die-coating, spray-coating, and curtain coating. CSD optionally comprises applying a sol-gel coating 623 or applying a layer of a pre-ceramic polymer composition 624. A suitable pre-ceramic polymer composition includes a polysilazane, for instance perhydropolysilazane.

As used herein, "polysilazane" refers to compounds having at least one of a linear, branched, or cyclic backbone comprising at least one Si—N linkage; these compounds comprise at least one ethylenically-unsaturated group or a SiH group. For simplicity, "polysilazane" also includes "polysiloxazane" and "polyureasilazane". "Polysiloxazane" refers to compounds having at least one of a linear, branched, or cyclic backbone comprising both Si—N and Si—O linkages. "Polyureasilazane" refers to compounds having at least one linear, branched, or cyclic backbone comprising at least one Si—N linkage and having at least one carbonyl group bonded to each of two nitrogen atoms. Polysilazane polymers are distinguished from polysiloxane polymers in that although the backbone of a polysiloxane comprises Si—O linkages, polysiloxanes lack Si—N linkages. Polysilazane polymers are known such as described in U.S. Pat. No. 7,297,374 (Arney et al.). Additional suitable polysilazanes include those described in U.S. Pat. No. 8,802,805 (Yang et al.).

A "sol-gel reaction" is a wet-chemical technique for chemical solution deposition for the fabrication of materials starting either from a chemical solution or colloidal particles (e.g., nanoscale particle) to produce an integrated network (i.e., gel). In some embodiments, sol-gel precursors can include metal alkoxides and metal chlorides, which undergo hydrolysis and polycondensation reactions to form a colloid, a system composed of solid particles (e.g., with sizes ranging from 1 nm to 1 micrometer) dispersed in a solvent. The sol can then evolve toward the formation of an inorganic continuous network containing a liquid phase (i.e., gel). Formation of a metal oxide can include connecting the metal centers with oxo (M-O-M) or hydroxo (M-OH-M) bridges, therefore generating metal-oxo or metal-hydroxo polymers in solution. A drying process can serve to remove the liquid phase from the gel thus forming a porous material. Afterwards, a thermal treatment (e.g., firing) may be performed to favor further polycondensation and enhance mechanical properties.

In some embodiments, a hardcoat composition or nanoparticulate containing hardcoat composition may be applied using CSD. Suitable hardcoat compositions are described above in detail with respect to the articles.

Select Embodiments of the Disclosure

Embodiment 1 is an article. The article includes a) an organic layer having a nanostructured first surface including nanofeatures defining nanorecesses and an opposing second surface; and b) a ceramic layer disposed on the nanostructured first surface of the organic layer and filling at least a portion of the nanorecesses. The ceramic layer has a nanostructured first surface including nanofeatures and an opposing second surface, and the nanostructured first surface of the ceramic layer is interpenetrated with the nanostructured first surface of the organic layer.

Embodiment 2 is the article of embodiment 1, wherein the organic layer includes a polymeric matrix.

Embodiment 3 is the article of embodiment 2, wherein the organic layer further includes a plurality of particles distributed in the polymeric matrix.

Embodiment 4 is the article of embodiment 3, wherein the particles include microparticles of resin, $SiO_2$, $ZrO_2$, $TiO_2$, ZnO, $Al_2O_3$, calcium carbonate, magnesium silicate, indium tin oxide, antimony tin oxide, tungsten oxide, tungsten bronze, or combinations thereof.

Embodiment 5 is the article of embodiment 3 or embodiment 4, wherein the particles include microparticles having an average diameter of greater than 500 nm to 50 micrometers.

Embodiment 6 is the article of any of embodiments 3 to 5, wherein the particles include microparticles of resin selected from the group consisting of polymethyl methacrylate beads, polycarbonate beads, polystyrene beads, polyacryl-styrene beads, polyvinyl chloride beads, and combinations thereof.

Embodiment 7 is the article of any of embodiments 3 to 6, wherein the particles include nanoparticles of $SiO_2$, $ZrO_2$, $TiO_2$, ZnO, $Al_2O_3$, calcium carbonate, magnesium silicate, indium tin oxide, antimony tin oxide, tungsten oxide, tungsten bronze, diamond, or combinations thereof.

Embodiment 8 is the article of embodiment 7, wherein the nanoparticles have an average diameter of 1 nanometers (nm) to 400 nm.

Embodiment 9 is the article of embodiment 8, wherein the nanoparticles have an average diameter of 5 nm to 200 nm.

Embodiment 10 is the article of any of embodiments 3 to 9, wherein the particles are present in the organic layer in a concentration of 1 to 60 volume percent, 2 to 40 volume percent, 3 to 30 volume percent, or 4 to 25 volume percent, of the total volume of the organic layer.

Embodiment 11 is the article of any of embodiments 2 to 10, wherein the polymeric matrix includes a polymer selected from the group consisting of polycarbonate, poly(meth)acrylate, polyester, nylon, fluoropolymer, urethane, epoxy, cyclic olefin copolymer, triacetate cellulose, cellulose diacetate, and blends or copolymers thereof.

Embodiment 12 is the article of any of embodiments 1 to 11, wherein the organic layer has a thickness between the opposing second surface of the organic layer and a surface of the nanorecesses proximal to the opposing second surface of the organic layer of 0.5 micrometer to 1 centimeter, 1 micrometer to 7.5 millimeters, 2 micrometers to 5 millimeters, or 5 micrometers to 3 millimeters.

Embodiment 13 is the article of any of embodiments 1 to 12, wherein the article is transparent to visible light.

Embodiment 14 is the article of any of embodiments 1 to 13, wherein the ceramic layer includes a ceramic material selected from the group consisting of silicon dioxide, silicon carbide, silicon oxycarbide, silicon nitride, silicon oxynitride, aluminum oxide, titanium oxide, zirconium oxide, stabilized zirconium oxide, diamond, diamond-like carbon, diamond-like glass, and combinations thereof.

Embodiment 15 is the article of any of embodiments 1 to 14, wherein the opposing second surface of the ceramic layer is substantially parallel to the opposing second surface of the organic layer.

Embodiment 16 is the article of any of embodiments 1 to 15, wherein the ceramic layer includes an organosilane surface functionalization on the opposing second surface.

Embodiment 17 is the article of any of embodiments 1 to 16, wherein the nanostructured surface of the organic layer includes nanofeatures having a height-to-width ratio of at least 1.5 to 1, at least 2 to 1, at least 3 to 1, at least 4 to 1, or at least 5 to 1.

Embodiment 18 is the article of any of embodiments 1 to 17, wherein the nanostructured surface of the organic layer includes nanofeatures having a height of from 25 to 2000 nm, 50 to 1000 nm, 100 to 750 nm, or 150 to 500 nm.

Embodiment 19 is the article of any of embodiments 1 to 18, wherein the nanostructured surface of the organic layer includes nanofeatures having a regular height.

Embodiment 20 is the article of any of embodiments 1 to 18, wherein the nanostructured surface of the organic layer includes nanofeatures having varying heights.

Embodiment 21 is the article of any of embodiments 1 to 20, wherein the nanorecesses have a depth-to-width ratio of at least 1.5 to 1, at least 2 to 1, at least 3 to 1, at least 4 to 1, or at least 5 to 1.

Embodiment 22 is the article of any of embodiments 1 to 21, wherein the nanorecesses have a depth of from 25 to 2000 nm, 50 to 1000 nm, 100 to 750 nm, or 150 to 500 nm.

Embodiment 23 is the article of any of embodiments 1 to 22, wherein the article further includes a polymer substrate adjacent to the opposing second surface of the organic layer.

Embodiment 24 is the article of embodiment 23, wherein the polymer substrate has a thickness of 0.5 micrometers to 1 centimeter, 1 micrometer to 7.5 millimeters, 2 micrometers to 5 millimeters, or 5 micrometers to 3 millimeters.

Embodiment 25 is the article of any of embodiments 1 to 24, wherein the ceramic layer has a thickness between the opposing second surface of the ceramic layer and a surface of the nanofeatures proximal to the opposing second surface of the ceramic layer of 50 nm to 10 micrometers, 100 nm to 5 micrometers, 200 nm to 3 micrometers, 250 nm to 2 micrometers, or 300 nm to 1 micrometer.

Embodiment 26 is the article of any of embodiments 1 to 25, wherein the organic layer exhibits an elastic storage modulus of between $1\times10^6$ and less than $1\times10^{10}$ pascals.

Embodiment 27 is the article of any of embodiments 1 to 26, wherein the organic layer exhibits an elastic modulus loss tangent of between 0.02 and 2, between 0.03 and 1, or between 0.04 and 2.

Embodiment 28 is the article of any of embodiments 1 to 27, wherein the ceramic layer includes a ceramic material that is amorphous.

Embodiment 29 is the article of any of embodiments 1 to 27, wherein the ceramic layer includes a ceramic material that is at least partially crystalline.

Embodiment 30 is the article of any of embodiments 1 to 29, wherein the ceramic layer has organic content of less than 50 percent by weight, less than 40, less than 25, less than 20, less than 15, less than 10, less than 5, less than 4, less than 3, less than 2, or less than 1 percent by weight.

Embodiment 31 is the article of any of embodiments 1 to 30, wherein the ceramic layer exhibits an elastic storage modulus of between greater than $1\times10^{10}$ and $1.3\times10^{12}$ pascals, $2\times10^{10}$ to $1\times10^{11}$ pascals, $2.5\times10^{10}$ to $7.5\times10^{10}$ pascals, or $3.0\times10^{10}$ to $6.0\times10^{10}$ pascals.

Embodiment 32 is the article of any of embodiments 1 to 31, wherein at least a portion of the nanostructured first surface of the organic layer further includes a mask coated thereon.

Embodiment 33 is a method of making an article. The method includes a) obtaining an organic layer having a nanostructured first surface comprising nanofeatures defining nanorecesses and an opposing second surface; and b) filling at least a portion of the nanorecesses of the nanostructured first surface of the organic layer with a ceramic layer of a ceramic material to form the article. The ceramic layer has a nanostructured first surface including nanofeatures and an opposing second surface, and the nanostructured first surface of the ceramic layer is interpenetrated with the nanostructured first surface of the organic layer.

Embodiment 34 is the method of embodiment 33, wherein the nanostructured first surface of the organic layer is formed by reactive ion etching the organic layer.

Embodiment 35 is the method of embodiment 33 or embodiment 34, wherein the organic layer includes a plurality of particles distributed in a polymeric matrix.

Embodiment 36 is the method of embodiment 35, wherein the particles include microparticles of resin, $SiO_2$, $ZrO_2$, $TiO_2$, ZnO, $Al_2O_3$, calcium carbonate, magnesium silicate, indium tin oxide, antimony tin oxide, tungsten oxide, tungsten bronze, or combinations thereof.

Embodiment 37 is the method of embodiment 35 or embodiment 36, wherein the particles include microparticles having an average diameter of greater than 500 nm to 50 micrometers.

Embodiment 38 is the method of any of embodiments 35 to 37, wherein the particles include microparticles of resin selected from the group consisting of polymethyl methacrylate beads, polycarbonate beads, polystyrene beads, polyacryl-styrene beads, polyvinyl chloride beads, and combinations thereof.

Embodiment 39 is the method of any of embodiments 35 to 38, wherein the particles include nanoparticles of $SiO_2$, $ZrO_2$, $TiO_2$, ZnO, $Al_2O_3$, calcium carbonate, magnesium silicate, indium tin oxide, antimony tin oxide, tungsten oxide, tungsten bronze, diamond, or combinations thereof.

Embodiment 40 is the method of embodiment 39, wherein the nanoparticles have an average diameter of 1 nm to 400 nm.

Embodiment 41 is the method of embodiment 39 or embodiment 40, wherein the nanoparticles have an average diameter of 5 nm to 200 nm.

Embodiment 42 is the method of any of embodiments 35 to 41, wherein the particles are present in the organic layer in a concentration of 1 to 60 volume percent, 2 to 40 volume percent, or 3 to 30 volume percent, of the total volume of the organic layer.

Embodiment 43 is the method of any of embodiments 33 to 42, wherein the polymeric matrix includes a polymer selected from the group consisting of polycarbonate, poly(meth)acrylate, polyester, nylon, fluoropolymer, urethane, epoxy, cyclic olefin copolymer, triacetate cellulose, cellulose diacetate, or blends or copolymers thereof.

Embodiment 44 is the method of embodiment 34, wherein the reactive ion etching includes deposition of a gaseous species selected from the group consisting of organosilicons, metal alkyls, metal alkoxides, metal beta-diketonates and metal halides, to mask a plurality of portions of the first surface of the organic layer, wherein the first surface of the organic layer is etched between the masked portions.

Embodiment 45 is the method of embodiment 33, wherein the nanostructured first surface of the organic layer is formed by nanoreplication.

Embodiment 46 is the method of any of embodiments 33 to 45, wherein the filling the nanorecesses of the nanostructured first surface of the organic layer with a ceramic material includes chemical vapor deposition.

Embodiment 47 is the method of any of embodiments 33 to 45, wherein the filling the nanorecesses of the nanostructured first surface of the organic layer with a ceramic material includes chemical solution deposition.

Embodiment 48 is the method of embodiment 47, wherein the chemical solution deposition includes applying a sol-gel coating to the nanostructured first surface of the organic layer.

Embodiment 49 is the method of embodiment 47, wherein the chemical solution deposition includes applying a layer of a pre-ceramic polymer composition to the nanostructured first surface of the organic layer.

Embodiment 50 is the method of embodiment 49, wherein the pre-ceramic polymer composition includes a polysilazane.

Embodiment 51 is the method of embodiment 50, wherein the polysilazane is perhydropolysilazane.

Embodiment 52 is the method of any of embodiments 47 to 51, wherein the chemical solution deposition is performed using a process selected from dip coating, spin-coating, die-coating, and curtain coating.

Embodiment 53 is the method of any of embodiments 33 to 52, further including disposing a polymer substrate adjacent to the opposing second surface of the organic layer.

Embodiment 54 is the method of embodiment 53, wherein the polymer substrate has a thickness of 5 micrometers to 1 centimeter.

Embodiment 55 is the method of any of embodiments 33 to 54, wherein the nanostructured surface includes nanofeatures having a height-to-width ratio of at least 1.5 to 1, at least 2 to 1, at least 3 to 1, at least 4 to 1, or at least 5 to 1.

Embodiment 56 is the method of any of embodiments 33 to 55, wherein the nanostructured surface of the organic layer includes nanofeatures having a height of from 25 to 2000 nm, from 50 to 1000 nm, from 100 nm to 750 nm, or from 150 to 500 nm.

Embodiment 57 is the method of any of embodiments 33 to 56, wherein the nanostructured surface of the organic layer includes nanofeatures having a regular height.

Embodiment 58 is the method of any of embodiments 33 to 56, wherein the nanostructured surface of the organic layer includes nanofeatures having varying heights.

Embodiment 59 is the method of any of embodiments 33 to 58, wherein the nanorecesses have a depth-to-width ratio of at least 1.5 to 1, 2 to 1, at least 3 to 1, at least 4 to 1, or at least 5 to 1.

Embodiment 60 is the method of any of embodiments 33 to 59, wherein the nanorecesses have a depth of from 25 to 1000 nm, 50 to 1000 nm, 100 to 750 nm, or 150 to 500 nm.

Embodiment 61 is the method of any of embodiments 33 to 60, wherein the ceramic layer has a thickness between the opposing second surface of the ceramic layer and a surface of the nanofeatures proximal to the opposing second surface of the ceramic layer of 50 nm to 10 micrometers, 100 nm to 5 micrometers, 200 nm to 3 micrometers, or 250 nm to 2 micrometers, or 300 nm to 1 micrometer.

Embodiment 62 is the method of any of embodiments 33 to 61, wherein the organic layer has a thickness between the opposing second surface of the organic layer and a surface of the nanorecesses proximal to the opposing second surface of the organic layer of 0.5 micrometer to 1 centimeter, 1 micrometer to 7.5 millimeters, 2 micrometers to 5 millimeters, or 5 micrometers to 3 millimeters.

Embodiment 63 is the method of any of embodiments 33 to 62, wherein the article is transparent to visible light.

Embodiment 64 is the method of any of embodiments 33 to 63, wherein the ceramic layer includes a ceramic material selected from the group consisting of silicon dioxide, silicon carbide, silicon oxycarbide, silicon nitride, silicon oxynitride, aluminum oxide, titanium oxide, zirconium oxide, stabilized zirconium oxide, diamond, diamond-like carbon, diamond-like glass, and combinations thereof.

Embodiment 65 is the method of any of embodiments 33 to 64, wherein the opposing second surface of the ceramic layer is substantially parallel to the opposing second surface of the organic layer.

Embodiment 66 is the method of any of embodiments 33 to 65, wherein the organic layer exhibits an elastic storage modulus of between $1 \times 10^6$ and less than $1 \times 10^{10}$ pascals.

Embodiment 67 is the method of any of embodiments 33 to 66, wherein the organic layer exhibits an elastic modulus loss tangent of between 0.02 and 2, between 0.03 and 1, or between 0.04 and 2.

Embodiment 68 is the method of any of embodiments 33 to 67, wherein the ceramic layer includes a ceramic material that is amorphous.

Embodiment 69 is the method of any of embodiments 33 to 67, wherein the ceramic layer includes a ceramic material that is at least partially crystalline.

Embodiment 70 is the method of any of embodiments 33 to 69, wherein the ceramic layer has organic content of less than 50 percent by weight, less than 40, less than 25, less than 20, less than 15, less than 10, less than 5, less than 4, less than 2, or less than 1 percent by weight.

Embodiment 71 is the method of any of embodiments 33 to 70, wherein the ceramic layer exhibits an elastic storage modulus of between greater than $1\times10^{10}$ and $1.3\times10^{12}$ pascals, $2\times10^{10}$ to $1\times10^{11}$ pascals, $2.5\times10^{10}$ to $7.5\times10^{10}$ pascals, $3.0\times10^{10}$ to $6.0\times10^{10}$ pascals.

Embodiment 72 is an article. The article includes a) a first layer including a first material with a first elastic storage modulus of between $1\times10^6$ and less than $1\times10^{10}$ pascals and having a nanostructured first surface including nanofeatures defining nanorecesses and an opposing second surface; and b) a second layer including a second material with a second elastic storage modulus of between greater than $1\times10^{10}$ and $1.3\times10^{12}$ pascals disposed on the nanostructured first surface of the first layer and filling the nanorecesses.

The second material is a non-metallic material. The second layer has a nanostructured first surface including nanofeatures and an opposing second surface, and the nanostructured first surface of the second layer is interpenetrated with the nanostructured first surface of the first layer.

Embodiment 73 is the article of embodiment 72, wherein the first elastic storage modulus is between $1\times10^6$ and $9.5\times10^9$ pascals and the second elastic storage modulus is between $1.2\times10^{10}$ and $1.3\times10^{12}$ pascals.

Embodiment 74 is the article of embodiment 72 or embodiment 73, wherein the first elastic storage modulus is between $1\times10^6$ and $7.5\times10^9$ pascals and the second elastic storage modulus is between $2\times10^{10}$ and $1.3\times10^{12}$ pascals.

Embodiment 75 is the article of any of embodiments 72 to 74, wherein the first layer has a thickness between the opposing second surface of the first layer and a surface of the nanorecesses proximal to the opposing second surface of the first layer of 0.5 micrometer to 1 centimeter, 1 micrometer to 7.5 millimeters, 2 micrometers to 5 millimeters, or 5 micrometers to 3 millimeters.

Embodiment 76 is the article of any of embodiments 72 to 75, wherein the second layer has a thickness between the opposing second surface of the second layer and a surface of the nanofeatures proximal to the opposing second surface of the second layer of 50 nm to 10 micrometers, 200 nm to 3 micrometers, 250 nm to 2 micrometers, or 300 nm to 1 micrometer.

Embodiment 77 is the article of any of embodiments 72 to 76, wherein the nanostructured surface of the first layer includes nanofeatures having a height-to-width ratio of at least 1.5 to 1, at least 2 to 1, at least 3 to 1, at least 4 to 1, or at least 5 to 1.

Embodiment 78 is the article of any of embodiments 72 to 77, wherein the nanostructured surface of the first layer includes nanofeatures having a height of from 25 to 2000 nm, 50 to 1000 nm, 100 to 750 nm, or 150 to 500 nm.

Embodiment 79 is the article of any of embodiments 72 to 78, wherein the nanostructured surface of the first layer includes nanofeatures having a regular height.

Embodiment 80 is the article of any of embodiments 72 to 78, wherein the nanostructured surface of the first layer includes nanofeatures having varying heights.

Embodiment 81 is the article of any of embodiments 72 to 80, wherein the nanorecesses have a depth-to-width ratio of at least 1.5 to 1, at least 2 to 1, at least 3 to 1, at least 4 to 1, or at least 5 to 1.

Embodiment 82 is the article of any of embodiments 72 to 81, wherein the nanorecesses have a depth of from 25 to 2000 nm, 50 to 1000 nm, 100 to 750 nm, or 150 to 500 nm Embodiment 83 is the article of any of embodiments 72 to 82, wherein the article further includes a polymer substrate adjacent to the opposing second surface of the first layer.

Embodiment 84 is the article of embodiment 83, wherein the polymer substrate has a thickness of 0.5 micrometers to 1 centimeter, 1 micrometer to 7.5 millimeters, 2 micrometers to 5 millimeters, or 5 micrometers to 3 millimeters.

Embodiment 85 is the article of any of embodiments 72 to 84, wherein the first material includes a material selected from the group consisting of polycarbonate, poly(meth)acrylate, polyester, nylon, fluoropolymer, urethane, epoxy, cyclic olefin copolymer, triacetate cellulose, cellulose diacetate, blends or copolymers thereof, hybrid organic-inorganic material, xerogel, and glass.

Embodiments 86 is the article of any of embodiments 72 to 85, wherein the second material includes material selected from the group consisting of silicon dioxide, silicon carbide, silicon oxycarbide, silicon nitride, silicon oxynitride, aluminum oxide, titanium oxide, zirconium oxide, stabilized zirconium oxide, diamond, diamond-like carbon, diamond-like glass, a hardcoat composition, a nanoparticulate containing hardcoat composition, and combinations thereof.

Embodiment 87 is a method of making an article. The method includes a) obtaining a first layer including a first material with a first elastic storage modulus of between $1\times10^6$ and less than $1\times10^{10}$ pascals and having a nanostructured first surface comprising nanofeatures defining nanorecesses and an opposing second surface; and b) filling at least a portion of the nanorecesses of the nanostructured first surface of the first layer with a second layer including a second material with a second elastic storage modulus of between greater than $1\times10^{10}$ and $1.3\times10^{12}$ pascals to form the article. The second material is a non-metallic material. The second layer has a nanostructured first surface including nanofeatures and an opposing second surface, and the nanostructured first surface of the second layer is interpenetrated with the nanostructured first surface of the first layer.

Embodiment 88 is the method of embodiment 87, wherein the first elastic storage modulus is between $1\times10^6$ and $9.5\times10^9$ pascals and the second elastic storage modulus is between $1.2\times10^{10}$ and $1.3\times10^{12}$ pascals.

Embodiment 89 is the method of embodiment 87 or embodiment 88, wherein the first elastic storage modulus is between $1\times10^6$ and $7.5\times10^9$ pascals and the second elastic storage modulus is between $2\times10^{10}$ and $1.3\times10^{12}$ pascals.

Embodiment 90 is the method of any of embodiments 87 to 89, wherein the first layer has a thickness between the opposing second surface of the first layer and a surface of the nanorecesses proximal to the opposing second surface of the first layer of 0.5 micrometer to 1 centimeter, 1 micrometer to 7.5 millimeters, 2 micrometers to 5 millimeters, or 5 micrometers to 3 millimeters.

Embodiment 91 is the method of any of embodiments 87 to 90, wherein the second layer has a thickness between the opposing second surface of the second layer and a surface of the nanofeatures proximal to the opposing second surface of the second layer of 50 nm to 10 micrometers, 100 nm to 5 micrometers, 200 nm to 3 micrometers, or 250 nm to 2 micrometers, or 300 nm to 1 micrometer.

Embodiment 92 is the method of any of embodiments 87 to 91, wherein the nanostructured surface of the first layer includes nanofeatures having a height-to-width ratio of at least 1.5 to 1, at least 2 to 1, at least 3 to 1, at least 4 to 1, or at least 5 to 1.

Embodiment 93 is the method of any of embodiments 87 to 92, wherein the nanostructured surface of the first layer includes nanofeatures having a height of from 25 to 2000 nm, 50 to 1000 nm, 100 to 750 nm, or 150 to 500 nm.

Embodiment 94 is the method of any of embodiments 87 to 93, wherein the nanostructured surface of the first layer includes nanofeatures having a regular height.

Embodiment 95 is the method of any of embodiments 87 to 94, wherein the nanostructured surface of the first layer includes nanofeatures having varying heights.

Embodiment 96 is the method of any of embodiments 87 to 95, wherein the nanorecesses have a depth-to-width ratio of at least 1.5 to 1, at least 2 to 1, at least 3 to 1, at least 4 to 1, or at least 5 to 1.

Embodiment 97 is the method of any of embodiments 87 to 96, wherein the nanorecesses have a depth of from 25 to 2000 nm, 50 to 1000 nm, 100 to 750 nm, or 150 to 500 nm.

Embodiment 98 is the method of any of embodiments 87 to 97, wherein the article further includes a polymer substrate adjacent to the opposing second surface of the first layer.

Embodiment 99 is the method of embodiment 98, wherein the polymer substrate has a thickness of 5 micrometers to 1 centimeter.

Embodiment 100 is the method of any of embodiments 87 to 99, wherein the first material includes a material selected from the group consisting of polycarbonate, poly(meth)acrylate, polyester, nylon, fluoropolymer, urethane, epoxy, cyclic olefin copolymer, triacetate cellulose, cellulose diacetate, blends or copolymers thereof, hybrid organic-inorganic material, xerogel, and glass.

Embodiments 101 is the method of any of embodiments 87 to 100, wherein the second material includes material selected from the group consisting of silicon dioxide, silicon carbide, silicon oxycarbide, silicon nitride, silicon oxynitride, aluminum oxide, titanium oxide, zirconium oxide, stabilized zirconium oxide, diamond, diamond-like carbon, diamond-like glass, a hardcoat composition, a nanoparticulate containing hardcoat composition, and combinations thereof.

Embodiment 102 is an article. The article includes a) a first layer including a first material with a first elastic storage modulus and having a nanostructured first surface including nanofeatures defining nanorecesses and an opposing second surface; and b) a second layer including a second material with a second elastic storage modulus disposed on the nanostructured first surface of the first layer and filling the nanorecesses. The second layer has a nanostructured first surface that is interpenetrated with the nanostructured first surface of the first layer, and an opposing second surface. The second material is non-metallic, and the second elastic storage modulus is at least 1.5 times the first elastic storage modulus.

Embodiment 103 is the article of embodiment 102, wherein the article is transparent to visible light.

Embodiment 104 is the article of embodiment 102 or embodiment 103, wherein the second elastic storage modulus is 2.0 times or more than the first elastic storage modulus.

Embodiment 105 is the article of any of embodiments 102 to 104, wherein the second elastic storage modulus is 5.0 times or more than the first elastic storage modulus.

Embodiment 106 is the article of any of embodiments 102 to 105, wherein the second elastic storage modulus is 10.0 times or more than the first elastic storage modulus.

Embodiment 107 is the article of any of embodiments 102 to 106, wherein the first layer has a thickness between the opposing second surface of the first layer and a surface of the nanorecesses proximal to the opposing second surface of the first layer of 0.5 micrometer to 1 centimeter, 1 micrometer to 7.5 millimeters, 2 micrometers to 5 millimeters, or 5 micrometers to 3 millimeters.

Embodiment 108 is the article of any of embodiments 102 to 107, wherein the second layer has a thickness between the opposing second surface of the second layer and a surface of the nanofeatures proximal to the opposing second surface of the second layer of 50 nm to 10 micrometers, 100 nm to 5 micrometers, 200 nm to 3 micrometers, 250 nm to 2 micrometers, or 300 nm to 1 micrometer.

Embodiment 109 is the article of any of embodiments 102 to 108, wherein the nanostructured surface of the first layer includes nanofeatures having a height-to-width ratio of at least 1.5 to 1, at least 2 to 1, at least 3 to 1, at least 4 to 1, or at least 5 to 1.

Embodiment 110 is the article of any of embodiments 102 to 109, wherein the nanostructured surface of the first layer includes nanofeatures having a height of from 25 to 2000 nm, 50 to 1000 nm, 100 to 750 nm, or 150 to 500 nm.

Embodiment 111 is the article of any of embodiments 102 to 110, wherein the nanostructured surface of the first layer includes nanofeatures having a regular height.

Embodiment 112 is the article of any of embodiments 102 to 110, wherein the nanostructured surface of the first layer includes nanofeatures having varying heights.

Embodiment 113 is the article of any of embodiments 102 to 112, wherein the nanorecesses have a depth-to-width ratio of at least 1.5 to 1, at least 2 to 1, at least 3 to 1, at least 4 to 1, or at least 5 to 1.

Embodiment 114 is the article of any of embodiments 102 to 113, wherein the nanorecesses have a depth of from 25 to 2000 nm, 50 to 1000 nm, 100 to 750 nm, or 150 to 500 nm.

Embodiment 115 is the article of any of embodiments 102 to 114, wherein the article further includes a polymer substrate adjacent to the opposing second surface of the first layer.

Embodiment 116 is the article of embodiment 115, wherein the polymer substrate has a thickness of 0.5 micrometers to 1 centimeter, 1 micrometer to 7.5 millimeters, 2 micrometers to 5 millimeters, or 5 micrometers to 3 millimeters.

Embodiment 117 is the article of any of embodiments 102 to 116, wherein the first material includes a material selected from the group consisting of polycarbonate, poly(meth)acrylate, polyester, nylon, fluoropolymer, urethane, epoxy, cyclic olefin copolymer, triacetate cellulose, cellulose diacetate, blends or copolymers thereof, hybrid organic-inorganic material, xerogel, and glass.

Embodiments 118 is the article of any of embodiments 102 to 117, wherein the second material includes material selected from the group consisting of silicon dioxide, silicon carbide, silicon oxycarbide, silicon nitride, silicon oxynitride, aluminum oxide, titanium oxide, zirconium oxide, stabilized zirconium oxide, diamond, diamond-like carbon, diamond-like glass, a hardcoat composition, a nanoparticulate containing hardcoat composition, and combinations thereof.

Embodiment 119 is a method of making an article. The method includes a) obtaining a first layer including a first material with a first elastic storage modulus and having a nanostructured first surface including nanofeatures defining nanorecesses and an opposing second surface; and b) filling at least a portion of the nanorecesses of the nanostructured first surface of the first layer with a second layer of a second material with a second elastic storage modulus to form the article. The second layer has a nanostructured first surface and an opposing second surface, and the nanostructure first surface of the second layer is interpenetrated with the nanostructured first surface of the first layer. The second material is non-metallic, and the second elastic storage modulus is at least 1.5 times the first elastic storage modulus.

Embodiment 120 is the method of embodiment 119, wherein the article is transparent to visible light.

Embodiment 121 is the method of embodiment 119 or embodiment 120, wherein the second elastic storage modulus is at least 2 times the first elastic storage modulus.

Embodiment 122 is the method of any of embodiments 119 to 121, wherein the second elastic storage modulus is at least 5 times the first elastic storage modulus.

Embodiment 123 is the method of any of embodiments 119 to 122, wherein the second elastic storage modulus is at least 10 times the first elastic storage modulus.

Embodiment 124 is the method of any of embodiments 119 to 123, wherein the first layer has a thickness between the opposing second surface of the first layer and a surface of the nanorecesses proximal to the opposing second surface of the first layer of 0.5 micrometer to 1 centimeter, 1 micrometer to 7.5 millimeters, 2 micrometers to 5 millimeters, or 5 micrometers to 3 millimeters.

Embodiment 125 is the method of any of embodiments 119 to 124, wherein the second layer has a thickness between the opposing second surface of the second layer and a surface of the nanofeatures proximal to the opposing second surface of the second layer of 50 nm to 10 micrometers, 100 nm to 5 micrometers, 200 nm to 3 micrometers, 250 nm to 2 micrometers, or 300 nm to 1 micrometer.

Embodiment 126 is the method of any of embodiments 119 to 125, wherein the nanostructured surface of the first layer includes nanofeatures having a height-to-width ratio of at least 1.5 to 1, at least 2 to 1, at least 3 to 1, at least 4 to 1, or at least 5 to 1.

Embodiment 127 is the method of any of embodiments 119 to 126, wherein the nanostructured surface of the first layer includes nanofeatures having a height of from 25 to 2000 nm, 50 to 1000 nm, 100 nm to 750 nm, or 150 to 500 nm.

Embodiment 128 is the method of any of embodiments 119 to 127, wherein the nanostructured surface of the first layer includes nanofeatures having a regular height.

Embodiment 129 is the method of any of embodiments 119 to 127, wherein the nanostructured surface of the first layer includes nanofeatures having varying heights.

Embodiment 130 is the method of any of embodiments 119 to 129, wherein the nanorecesses have a depth-to-width ratio of at least 1.5 to 1, at least 2 to 1, at least 3 to 1, at least 4 to 1, or at least 5 to 1.

Embodiment 131 is the method of any of embodiments 119 to 130, wherein the nanorecesses have a depth of from 25 to 2000 nm, 50 to 1000 nm, 100 to 750 nm, or 150 to 500 nm.

Embodiment 132 is the method of any of embodiments 119 to 131, wherein the article further includes a polymer substrate adjacent to the opposing second surface of the first layer.

Embodiment 133 is the method of embodiment 132, wherein the polymer substrate has a thickness of 0.5 micrometer to 1 centimeter, 1 micrometer to 7.5 millimeters, 2 micrometers to 5 millimeters, or 5 micrometers to 3 millimeters.

Embodiment 134 is the method of any of embodiments 119 to 133, wherein the first material includes a material selected from the group consisting of polycarbonate, poly(meth)acrylate, polyester, nylon, fluoropolymer, urethane, epoxy, cyclic olefin copolymer, triacetate cellulose, cellulose diacetate, blends or copolymers thereof, hybrid organic-inorganic material, xerogel, and glass.

Embodiments 135 is the method of any of embodiments 119 to 134, wherein the second material includes material selected from the group consisting of silicon dioxide, silicon carbide, silicon oxycarbide, silicon nitride, silicon oxynitride, aluminum oxide, titanium oxide, zirconium oxide, stabilized zirconium oxide, diamond, diamond-like carbon, diamond-like glass, a hardcoat composition, a nanoparticulate containing hardcoat composition, and combinations thereof.

EXAMPLES

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Test Methods

Nanostructure Depth Measurement by SEM

Selected substrates having a surface nanostructure were examined in cross section by scanning electron microscopy (SEM). Cross section samples were prepared by fracturing in liquid nitrogen. The cross section samples were mounted on aluminum stubs. Specimens were sputter coated with gold/palladium and were examined using a Hitachi SU8230 Field Emission Scanning Electron Microscope (FESEM). Nanostructure depth was measured directly for such cross section images.

Vertically Interpenetrating Nanofeature Thickness Measurement by SEM

Selected substrates (e.g., first layer) having coated (e.g., first layer) surface nanostructures were examined in cross section by scanning electron microscopy (SEM). Cross section samples were prepared by fracturing in liquid nitrogen. The cross section samples were mounted on aluminum stubs. Specimens were sputter coated with gold/palladium and were examined using a Hitachi SU8230 Field Emission Scanning Electron Microscope (FESEM). The thickness of the vertically interpenetrating nanofeatures was measured directly for such cross section images.

Layer Thickness Measurement by SEM

Selected substrates (e.g., first layer) having a coated (e.g., second layer) surface nanostructure were examined in cross section by scanning electron microscopy (SEM). Cross section samples were prepared by fracturing in liquid nitrogen. The cross section samples were mounted on aluminum stubs. Specimens were sputter coated with gold/palladium and were examined using a Hitachi SU8230 Field Emission Scanning Electron Microscope (FESEM). The thickness of the coating (e.g., second) layer was measured directly for such cross section images.

Abrasion Resistance Test Method

The major surface of polymeric film substrates and articles were tested for their abrasion resistance using ASTM 1044-13 "Standard Test Method for Resistance of Transparent Plastics to Surface Abrasion" (published September 2013) using resilient bonded abrasive wheels (obtained under the trade designation CALIBRASE CS-10F from Taber Industries, North Tonawanda, NY) for 500 cycles using 500 grams applied mass. For each example and comparative example, two replicate samples were made and tested. Results reported herein are averages of values for the two replicates.

Materials

TABLE 1

Chemical Materials

| Trade Designation or Abbreviation | Description |
| --- | --- |
| PHPS | Perhydropolysilazane (20%) in di-n-butyl ether (obtained under trade designation NN120-20(A) from EMD Performance Materials, Philadelphia, PA). |
| ATSB | Aluminum tri-sec-butoxide (obtained under trade designation 30721-36 Aluminum sec-butoxide, 95%, from Alfa Aesar, Tewksbury, MA). |
| SR399 | Dipentaerythritol pentaacrylate (obtained under trade designation SR399 from Sartomer Americas, Exton, PA). |
| SR295 | Pentaerythritol tetraacrylate (obtained under trade designation SR295 from Sartomer Americas). |
| SR238 | 1,6-Hexanediol diacrylate (obtained under trade designation SR238 from Sartomer Americas). |
| SR506 | Isobornyl acrylate (obtained under trade designation SR506 from Sartomer Americas). |
| SR9035 | Ethoxylated (15) trimethylolpropane triacrylate (obtained under trade designation SR9035 from Sartomer Americas). |
| SR444C | Pentaerythritol triacrylate (obtained under trade designation SR444C from Sartomer Americas). |
| SR344 | Polyethylene glycol (400 diacrylate (obtained under trade designation SR344 from Sartomer Americas). |
| TEGO RAD | Silicone acrylate radiation-curable defoaming additive (obtained under trade designation TEGO RAD 2500 from Evonik Resource Efficiency, Essen Germany). |
| ESACURE ONE | Difunctional oligomeric alpha-OH ketone photo-initiator (obtained under the trade designation ESACURE ONE from IGM Resins USA, St. Charles, IL). |
| OMNIRAD 184 | 1-Hydroxy-cyclohexyl-phenyl-ketone photo-initiator (obtained under trade designation OMNIRAD 184 from IGM Resins (Waalwijk, The Netherlands). |
| HFPOUA | Perfluoropolyether urethane multi-acrylate (HFPOUA) prepared according to the procedure outlined in U.S. Pat. No. 7,178,264, Preparation No. 6 (Preparation of Des N100/0.90 PET3A/0.15 HFPO). |
| NALCO 2327 | 20 nm diameter silica nanoparticles (obtained under the trade designation NALCO 2327, Nalco Chemical Company, Naperville, IL). |
| NALCO 2329K | 75 nm diameter silica nanoparticles (obtained under the trade designation NALCO 2329K, Nalco Chemical Company, Naperville, IL) |
| A-174 | Gamma-methacryloxypropyltrimethoxysilane, (obtained under the trade designation SILQUEST A-174 from Momentive Performance Materials, Waterford, NY). |
| PROSTAB 5198 | 4-hydroxy- 2,2,6,6phps-tetramethylpiperidine 1-oxyl (obtained under trade designation PROSTAB 5198 from Ciba Specialty Chemicals, Tarrytown, NY). |
| SR601 | Ethoxylated (4) bisphenol a diacrylate (obtained under trade designation SR601 from Sartomer Americas). |
| DOWANOL PM | 1-Methoxy-2-propanol (obtained under trade designation DOWANOL PM from Dow Chemical Company, Midland, MI). |
| MEK | 2-Butanone (obtained under trade designation L13185 2-Butanone, 99%, from Alfa Aesar, Haverhill, MA). |
| CHO | Cyclohexanone (obtained under the trade designationA15607 Cyclohexanone, 99+%, from Alfa Aesar). |
| WB50 | A water-soluble sulfopolyester polymer at about 20 wt. % solids, prepared as described in U.S. Patent Application Publication No. 2014/0308477. |
| 10 nm $ZrO_2$ | Functionalized zirconia nanoparticles prepared as described on page 27, lines 1 through page 18, line 2 of PCT Application Publication No. WO 2007/146686. |
| Acetone | 2-Propanone (obtained under trade designation L10407 Acetone, 99+%, from Alfa Aesar). |
| AcAc | 2,4-Pentanedione (obtained under the trade designation A14117 2,4-Pentanedione, 99%, from Alfa Aesar). |
| IPA | Isopropyl alcohol (obtained under the trade designation PX1835-6 from EMD Millipore Corporation, Billerica, MA). |
| | Nitric acid (68.0-70.0%) (obtained under trade designation NX0409P-5 from EMD Millipore Corporation). |

TABLE 2

Substrate Film Materials

| Trade Designation or Abbreviation | Description |
| --- | --- |
| ST580 | Poly(ethyleneterephthalate) film having thickness of approximately 75 micrometers (obtained under the trade designation ST580 from Dupont Teijin Films, Chester, VA). |
| ST505 | Poly(ethyleneterephthalate) film having thickness of approximately 125 micrometers (obtained under the trade designation ST505 from Dupont Teijin Films). |
| PET1 | Five mil (0.13 mm) primed poly(ethyleneterephthalate) (PET) film (obtained from 3M Company, St. Paul, MN under the trade designation SCOTCHPAK). |

Preparatory Methods

Preparation of Functionalized 20 nm Diameter Silica Nanoparticles 6.44 parts by weight of A-174 and 0.13 parts by weight of PROSTAB 5198 were added to a mixture of 100 parts by weight of NALCO 2327 and 113 parts by weight of 1-methoxy-2-propanol in a glass jar with stirring at room temperature for 10 minutes. The jar was sealed and placed in an oven set at 80° C. for 16 hours. Then, the water was removed from the resultant solution with a rotary evaporator at 60° C. until the solid wt. % of the solution was close to 45 wt. %. 50 parts by weight of 1-methoxy-2-propanol was charged into the resultant solution and then remaining water was removed by using the rotary evaporator at 60° C. This latter step was repeated for a second time to further remove water from the solution. Finally, the concentration of total $SiO_2$ nanoparticles was adjusted to 45 wt. % by adding 1-methoxy-2-propanol to result in the $SiO_2$ sol containing surface modified $SiO_2$ nanoparticles with an average size (e.g., diameter) of 20 nm.

Preparation of Functionalized 75 nm Diameter Silica Nanoparticles 3-(methacryloxypropyl)trimethoxysilane treated silica dispersion was prepared as follows: A flask equipped with a stir bar, stir plate, condenser, heating mantle, and thermocouple/temperature controller was charged with 100 parts by weight of NALCO 2329K. To this dispersion, 117 parts by weight of 1-methoxy-2-propanol was added with stirring. Next, 1.64 parts by weight of 97% A-174, 0.1 parts by weight of 5 wt. % PROSTAB 5198 and 17 parts by weight of 1-methoxy-2-propanol were mixed in a beaker. The A-174/PROSTAB 5198/1-methoxy-2-propanol mixture was added to the batch of NALCO 2329K and 1-methoxy-2-propanol, with stirring. The beaker containing the mixture was rinsed with aliquots of 1-methoxy-2-propanol totaling 17 parts by weight. The rinses were added to the batch. The batch was heated to 80° C. and held for approximately 16 hours. The batch was cooled to room temperature and then transferred to a distillation flask. The water was removed from the batch by alternate vacuum distillation and 133 parts by weight 1-methoxy-2-propanol was added. The batch was concentrated by vacuum distillation to result in a very fluid translucent dispersion with 36.7 wt. % solids. The batch was filtered through nylon mesh and transferred to a 16 ounce amber glass bottle.

Preparation of Nanocomposite Coated Substrates—Series 1

Different composite coatings were deposited on pieces of the ST580 substrate by conventional solvent coating methods, as described in paragraph [0267] of U.S. Patent Application Publication 2013/0299214 (Frey et al.). The coatings included a prepolymer blend comprising three monomers: 40% SR295, 40% SR238, and 20% SR506. The composite coatings further comprised functionalized 20 nm diameter silica nanoparticles. Solutions for casting the composite coatings were prepared by dissolving the monomer blend in 1-methoxy-2-propanol solutions of the functionalized 20 nm diameter silica nanoparticles (40 wt. %). Coatings were formulated to give different weight fraction ratios of resin:particles: 96:4, 85:15, and 50:50 in the final dried and cured coatings, also referred to herein as 4% 20 nm nanoparticle, 15% 20 nm nanoparticle, and 50% 20 nm nanoparticle nanocomposite coatings, respectively. OMNIRAD 184 was included in all of the formulations at a level of 0.5 wt. % of the weight of the final solid components (particles and monomer). All of the solutions were diluted with 1-methoxy-2-propanol to a final % solids of 40%. For each coating, the solution was syringe-pumped through a coating die onto the PET film, dried at 65° C. and cured by using a Fusion 300 Watt/inch UV processor (Heraeus Noblelight America, Buford, Georgia) equipped with a H-Bulb under a nitrogen atmosphere at 10 feet per minute (fpm) (3 meters per minute), yielding nanocomposite coating thicknesses of greater than 3 micrometers. Volume percent loadings of silica nanoparticles, reported herein, assume silica density of approximately 2.2 grams per cubic centimeter and matrix density of approximately 1.2 grams per cubic centimeter.

Preparation of Nanocomposite Coated Substrates—Series 2

A composite coating was deposited on a PET1 substrate by conventional solvent coating methods. The PET1 substrate was first primed with an approximately 87 nm thick layer of primer. The primer coating was cast from a solution of 72.521% CHO, 24.577% MEK, 1.391% WB50, 0.807% 10 nm $ZrO_2$ nanoparticles, 0.561% DOWANOL PM, 0.062% SR399, 0.062% SR601, and 0.019% OMNIRAD 184. The solution was syringe-pumped through a coating die onto the PET1 film, dried at 120° C. and cured by using a UV processor equipped with a H-Bulb under a nitrogen atmosphere at 20 fpm (6.1 meters per minute). After priming, a nanocomposite coating was applied to the PET1 substrate. The nanocomposite coating was applied from a solution of 31.943% DOWANOL PM, 26.135% functionalized 75 nm diameter silica nanoparticles, 22.901% MEK, 7.638% SR444C, 5.569% SR9035, 4.137% SR399, 0.684% SR344, 0.603% ESACURE ONE, 0.234% HFPOUA, and 0.156% acetone. The solution was syringe-pumped through a coating die onto the primed PET1 film, dried at 120° C., and cured by using a Fusion 600 Watt/inch UV processor equipped with a H-Bulb under a nitrogen atmosphere at 20 fpm (6.1 meters per minute), yielding a nanocomposite coating thickness of 5.5 micrometers and a functionalized 75 nm diameter silica nanoparticle loading in the nanocomposite coating of approximately 58% by weight and approximately 43% by volume. Volume percent loadings of silica nanoparticles, reported herein, assume silica density of approximately 2.2 grams per cubic centimeter and matrix density of approximately 1.2 grams per cubic centimeter.

Preparation of Nanocomposite Coated Substrates—Series 3

Different composite coatings were deposited on pieces of the ST505 substrate by conventional solvent coating methods. The coatings included SR399 monomer, functionalized 75 nm diameter silica nanoparticles, and ESACURE One photoinitiator. Solutions for casting the composite coatings were prepared by dissolving the monomer in 1-methoxy-2-propanol solutions of the functionalized 75 nm diameter silica nanoparticles. Coatings were formulated to give different weight fraction ratios of resin:particles: 80:20 ("HC20" coating) and 60:40 ("HC40" coating) in the final dried and cured coatings, also referred to herein as 20% 75 nm nanoparticle and 40% 75 nm nanoparticle nanocomposite coatings, respectively. ESACURE One photoinitator was included in all of the formulations at a level of 2 wt. % of the weight of the other solid components (i.e., particles and monomer). The solutions were diluted with 1-methoxy-2-propanol to a final % solids of 60%. For each coating, the solution was syringe-pumped through a coating die onto the PET film, dried at 90° C. and cured by using a UV processor equipped with a H-Bulb under a nitrogen atmosphere at 10 fpm (3 meters per minute). HC 40 coatings were prepared at final dried and cured coating thickness of 6 micrometers. HC20 coatings were prepared at final dried and cured coating thickness of 9 micrometers. Volume percent loadings of silica nanoparticles, reported herein, assume silica density of approximately 2.2 grams per cubic centimeter and matrix density of approximately 1.2 grams per cubic centimeter.

Methods for Nanostructuring the Surface of Substrates

Selected nanocomposite coated substrates were rendered to have a nanostructured surface by reactive ion etching (RIE) the nanocomposite coating surface as described in paragraph [0268] of U.S. Patent Application Publication 2013/0299214 (Frey et al.).

Methods for Coating Substrates

Ceramic layers were applied to substrates (e.g., polymeric film substrates; inorganic nanoparticle-filled polymer nanocomposite coated polymeric film substrates; nanostructured (e.g., reactive ion etched) inorganic nanoparticle-filled polymer nanocomposite coated polymeric film substrates) by dip-coating an inorganic precursor solution on their major surface using a laboratory scale dip-coater (obtained as model number RDC 15 from Bungard Elektronik GnbH & Co, Windeck, Germany). Film substrates were mounted flat to pieces of glass for dip-coating one major surface. Substrates were withdrawn from precursor solutions at controlled velocity ranging from 5 cm/minute to 200 cm/minute in ambient air. After air-drying at ambient temperature, the coated substrates were dried at elevated temperature in a forced air oven (obtained as model number LFD1-42-3 from Despatch, division of Illinois Tool Works, Minneapolis, MN). PHPS-derived coatings were aged for one week in ambient air before abrasion testing.

Coating layers were prepared by dip-coating the PHPS solution or a sol-gel alumina precursor solution. The sol-gel alumina precursor solution was prepared by mixing 34.49 grams of ATSB with 84.14 grams of IPA and stirring for 30 minutes at room temperature. Then, 14.02 grams of AcAc was added to the above mixture and stirred for 60 minutes at room temperature to yield a modified alkoxide solution. Separately, a hydrolysis solution of 2.52 grams of deionized water and 42.07 grams of IPA was prepared by stirring. The hydrolysis solution was next added to the modified alkoxide solution, dropwise with stirring, followed by stirring for 30 minutes. Finally, a drop of concentrated nitric acid was added, with stirring for 60 minutes. This sol-gel alumina precursor solution was aged for one day before being used for dip-coating.

For PHPS-derived coatings oven treated at 100° C. for 30 minutes, the composition of the deposited coating was determined by x-ray photoelectron spectroscopy to be approximately 32.0 atomic percent silicon, 67.1 atomic percent oxygen, 0.5 atomic percent sodium, and approximately 0.2 atomic percent nitrogen (described herein as a silica ($SiO_2$) coating). These silica (i.e., silicon oxide) based coatings were essentially entirely metal oxide (also can be referred to as a metalloid oxide) in nature, with a small amount of nitride content (i.e., greater than 99 percent by weight inorganic, or stated differently greater than 99 percent by weight ceramic). In work to determine the approximate thickness of the PHPS-derived ceramic coatings as a function of dip-coating withdrawal speed, ellipsometry revealed the dependence reported in Table 3 (for coatings applied by dip-coating PHPS onto soda-lime glass slides). The PHPS-derived silica coating treated at 100° C. for 30 minutes was measured by nanoindentation to have an elastic modulus of 34 GPA ($3.4 \times 10^{10}$ pascals), using a iNano nanoindenter (Nanomechanics, Inc., Oak Ridge, Tennessee).

TABLE 3

| Thickness of PHPS-derived ceramic layers | |
|---|---|
| Dip-coating speed (cm/min) | Layer thickness (micrometers) |
| 5 | 0.37 |
| 10 | 0.53 |
| 25 | 0.83 |
| 50 | 1.1 |
| 100 | 1.7 |
| 150 | 1.9 |
| 200 | 2.0 |

For sol-gel derived alumina-based coatings oven treated at 120° C. for 30 minutes, the composition of the deposited coating was determined by x-ray photoelectron spectroscopy (XPS). XPS does not reveal the hydrogen content. Due to the relatively high content of carbon and a reasonable assumption that the carbon may exist predominantly as a constituent of sec-butyl groups, an estimate of hydrogen content was made by assuming 9 hydrogen atoms per 4 carbon atoms detected by XPS. The coating composition was determined to be approximately 26.69 weight percent aluminum, approximately 0.70 weight percent magnesium, approximately 0.42 weight percent calcium, approximately 0.38 weight percent silicon, approximately 0.31 weight percent sodium, and approximately 30.26 weight percent oxygen (total metal oxide content of approximately 61.75 weight percent); approximately 32.17 percent by weight carbon and approximately 6.08 weight percent hydrogen (total hydrocarbon content of approximately 38.25 weight percent). The dried coatings are referred to herein as alumina (i.e., aluminum oxide) based coatings. In work to determine the approximate thickness of sol-gel derived alumina (i.e., aluminum oxide) based coatings, as a function of dip-coating withdrawal speed, ellipsometry revealed the dependence reported in Table 4 (for coatings applied by dip-coating the sol-gel alumina precursor solution onto soda-lime glass slides):

TABLE 4

Thickness of sol-gel-derived ceramic layers

| Dip-coating speed (cm/min) | Layer thickness (micrometers) |
|---|---|
| 5 | 0.47 |
| 10 | 0.56 |
| 25 | 0.99 |
| 50 | 1.5 |

Comparative Examples C1, C7, C13; Examples 2-6, 8-12, 14-18

Series 1 nanocomposite coated film substrates with nanoparticle loadings as given in Table 5 were reactive ion etched according to conditions given in Table 5 to yield nanostructured surface substrates. The nanostructured surface substrates were coated with a ceramic coating of primarily silica ($SiO_2$) by dip coating with PHPS at dip speeds given in Table 5. Coating with silica yielded a vertically interpenetrating nanostructured layer (with approximate thickness of 300 nanometers) between the organic (or first) layer and the ceramic (or second) layer of thickness approximated by the reported target inorganic overcoat thickness. The target ceramic layer thickness values in Table 5 correlate to the thickness values measured for identical coating conditions on glass, as reported above. The Series 1 nanocomposite coatings (i.e., organic (first) layer) are estimated to have an elastic storage modulus of between $1 \times 10^9$ pascals and less than $1 \times 10^{10}$ pascals (Hideki Sugimoto, Kazuki Daimatsu, Eiji Nakanishi, Yutaka Ogasawara, Takashi Yasumura, Katsuhiro Inomata, "Preparation and properties of poly(methylmethacrylate)-silica hybrid materials incorporating reactive silica nanoparticles," *Polymer* 47, 3754-3759 (2006); B. Ramezanzadeh, M. Mohseni, H. Yari, S. Sabbaghian "A study of thermal-mechanical properties of an automotive coating exposed to natural and simulated bird droppings," *Journal of Thermal Analysis and Calorimetry* 102, 13-21 (2010)).

TABLE 5

| Example No. | 20 nm $SiO_2$ Particle Loading (wt. %) | 20 nm $SiO_2$ Particle Loading (vol. %) | $O_2$ Reactive Ion Etch Time (seconds) | Approximate Nanostructure Depth (nm) | PHPS Dip Speed for Ceramic Layer (cm/min) | Target Ceramic Layer Thickness (micrometer) |
|---|---|---|---|---|---|---|
| C1 | 4% | 2.2% | 90 | 300 | No Coating | N/A |
| 2 | 4% | 2.2% | 90 | 300 | 5 | 0.37 |
| 3 | 4% | 2.2% | 90 | 300 | 10 | 0.53 |
| 4 | 4% | 2.2% | 90 | 300 | 25 | 0.83 |
| 5 | 4% | 2.2% | 90 | 300 | 50 | 1.1 |
| 6 | 4% | 2.2% | 90 | 300 | 200 | 2.0 |
| C7 | 15% | 8.8% | 90 | 300 | No Coating | N/A |
| 8 | 15% | 8.8% | 90 | 300 | 5 | 0.37 |
| 9 | 15% | 8.8% | 90 | 300 | 10 | 0.53 |
| 10 | 15% | 8.8% | 90 | 300 | 25 | 0.83 |
| 11 | 15% | 8.8% | 90 | 300 | 50 | 1.1 |
| 12 | 15% | 8.8% | 90 | 300 | 200 | 2.0 |
| C13 | 50% | 35% | 90 | 300 | No Coating | N/A |
| 14 | 50% | 35% | 90 | 300 | 5 | 0.37 |
| 15 | 50% | 35% | 90 | 300 | 10 | 0.53 |
| 16 | 50% | 35% | 90 | 300 | 25 | 0.83 |
| 17 | 50% | 35% | 90 | 300 | 50 | 1.1 |
| 18 | 50% | 35% | 90 | 300 | 200 | 2.0 |

FIG. 4c is a cross-sectional scanning electron photomicrograph showing an upper portion of the nanocomposite layer (bottom of the image), the silica ceramic layer (top of the image), and the vertically interpenetrating nanostructured layer interposed therebetween, for the article of Example 9. The coating thickness was measured to be approximately 0.6 micrometers (600 nanometers). The vertically interpenetrating nanostructured layer thickness was measured to range from approximately 0.3 to 0.4 micrometers (300 nanometers to 400 nanometers). The abrasion resistance of the articles including both nanostructured surface substrates and ceramic nanostructured surfaces was measured, and results are given in Table 6. An "improvement factor" is included in Table 6. The improvement factor relates to the abrasion resistance of articles that include the silica coating (e.g., overcoated film) vs. substrates that do not include the silica coating (non-overcoated film, i.e., Comparative Example films). It is given by delta-% $H_{non-overcoated}$/delta-% $H_{overcoated}$. Non-ceramic-coated Comparative Example film samples were oven processed identically to coated samples, before abrasion testing.

TABLE 6

| Example No. | Haze before Abrasion (%) | Haze after Abrasion (%) | Change in Haze with Abrasion (%) | Improvement Factor |
|---|---|---|---|---|
| C1 | 1.74 | 27.9 | 26.1 | N/A |
| 2 | 0.69 | 5.96 | 5.27 | 5.0 |
| 3 | 0.59 | 5.35 | 4.76 | 5.5 |
| 4 | 0.53 | 5.11 | 4.59 | 5.7 |
| 5 | 0.63 | 5.17 | 4.54 | 5.7 |
| 6 | 0.58 | 5.17 | 4.59 | 5.7 |
| C7 | 1.00 | 19.7 | 18.7 | N/A |
| 8 | 0.54 | 6.35 | 5.81 | 3.2 |
| 9 | 0.65 | 3.75 | 3.11 | 6.0 |
| 10 | 0.50 | 3.96 | 3.46 | 5.4 |
| 11 | 0.40 | 4.70 | 4.30 | 4.3 |
| 12 | 0.46 | 5.31 | 4.85 | 3.9 |
| C13 | 1.02 | 16.38 | 15.35 | N/A |
| 14 | 0.52 | 13.81 | 13.29 | 1.2 |
| 15 | 0.50 | 5.35 | 4.86 | 3.2 |
| 16 | 0.54 | 4.99 | 4.45 | 3.4 |
| 17 | 0.56 | 4.98 | 4.42 | 3.5 |
| 18 | 0.56 | 5.31 | 4.76 | 3.2 |

Comparative Examples C19-25, C31; Examples 26-30, 32-36

Series 2 nanocomposite coated film substrates with nanoparticle loading of 58% by weight were reactive ion etched according to conditions given in Table 7 to yield nanostructured surface substrates. Nanocomposite coated films, both as-nanocomposite-coated films and as-nanostructured films by reactive ion etching, were overcoated with a ceramic coating of primarily silica ($SiO_2$) by dip coating with PHPS at dip speeds given in Table 7. Overcoating with silica yielded a vertically interpenetrating nanostructured buffer layer between the nanocomposite layer and the inorganic (also referred to herein as ceramic) overcoat layer of thickness approximated by the reported target inorganic overcoat thickness. The target inorganic overcoat thickness values in Table 7 correlate to the thickness values measured for identical coating conditions on glass, as reported above. The Series 2 nanocomposite coating (i.e., first layer) has an elastic modulus of $1.1\times10^{10}$ and $1.3\times10^{10}$ pascals, as measured by an iNano nanoindenter (Nanomechanics, Inc., Oak Ridge, TN).

TABLE 7

| Example No. | 75 nm $SiO_2$ Particle Loading (wt. %) | 75 nm $SiO_2$ Particle Loading (vol. %) | Reactive Ion Etch Process Type | Reactive Ion Etch Time (seconds) | Approximate Nanostructure Depth (nm) | PHPS Dip Speed for Ceramic Layer (cm/min) | Target Ceramic Layer Thickness (micrometer) |
|---|---|---|---|---|---|---|---|
| C19 | 58% | 43% | N/A | N/A | N/A | No Coating | N/A |
| C20 | 58% | 43% | N/A | N/A | N/A | 5 | 0.37 |
| C21 | 58% | 43% | N/A | N/A | N/A | 10 | 0.53 |
| C22 | 58% | 43% | N/A | N/A | N/A | 25 | 0.83 |
| C23 | 58% | 43% | N/A | N/A | N/A | 50 | 1.1 |
| C24 | 58% | 43% | N/A | N/A | N/A | 200 | 2.0 |
| C25 | 58% | 43% | $O_2$ | 30 | 30 | No Coating | N/A |
| 26 | 58% | 43% | $O_2$ | 30 | 300 | 5 | 0.37 |
| 27 | 58% | 43% | $O_2$ | 30 | 300 | 10 | 0.53 |
| 28 | 58% | 43% | $O_2$ | 30 | 300 | 25 | 0.83 |
| 29 | 58% | 43% | $O_2$ | 30 | 300 | 50 | 1.1 |
| 30 | 58% | 43% | $O_2$ | 30 | 300 | 200 | 2.0 |
| C31 | 58% | 43% | RNS | 30 | 300 | No Coating | N/A |
| 32 | 58% | 43% | RNS | 30 | 300 | 5 | 0.37 |
| 33 | 58% | 43% | RNS | 30 | 300 | 10 | 0.53 |
| 34 | 58% | 43% | RNS | 30 | 300 | 25 | 0.83 |
| 35 | 58% | 43% | RNS | 30 | 300 | 50 | 1.1 |
| 36 | 58% | 43% | RNS | 30 | 300 | 200 | 2.0 |

The abrasion resistance of the articles including both nanostructured surface substrates and the ceramic nanostructured surfaces was measured, and results are given in Table 8. An "improvement factor" is included in Table 8. The improvement factor relates to the abrasion resistance of articles that include the silica coating (e.g., overcoated film) vs. substrates that do not include the silica coating (non-overcoated film, i.e., Comparative Example films). It is given by delta-% $H_{non-overcoated}$/delta-% $H_{overcoated}$. Non-ceramic-overcoated comparative example film samples were oven processed identically to overcoated samples, before abrasion testing.

TABLE 8

| Example No. | Haze before Abrasion (%) | Haze after Abrasion (%) | Change in Haze with Abrasion (%) | Improvement Factor |
| --- | --- | --- | --- | --- |
| C19 | 1.30 | 11.5 | 10.2 | N/A |
| C20 | 1.33 | 6.67 | 5.34 | 2.0 |
| C21 | 1.34 | 6.05 | 4.71 | 2.3 |
| C22 | 1.37 | 5.75 | 4.38 | 2.4 |
| C23 | 1.45 | 7.28 | 5.83 | 1.8 |
| C24 | 1.69 | 8.42 | 6.73 | 1.6 |
| C25 | 1.66 | 8.33 | 6.67 | N/A |
| 26 | 1.42 | 5.92 | 4.50 | 1.5 |
| 27 | 1.53 | 5.13 | 3.60 | 1.9 |
| 28 | 1.44 | 4.56 | 3.11 | 1.2 |
| 29 | 1.35 | 4.34 | 2.99 | 2.2 |
| 30 | 1.52 | 4.56 | 3.04 | 2.2 |
| C31 | 1.60 | 7.38 | 5.78 | N/A |
| 32 | 1.27 | 4.81 | 3.54 | 1.6 |
| 33 | 1.38 | 4.34 | 2.96 | 2.0 |
| 34 | 1.33 | 3.78 | 2.45 | 2.4 |
| 35 | 1.42 | 4.15 | 2.73 | 2.1 |
| 36 | 1.40 | 4.68 | 3.28 | 1.8 |

Comparative Examples C37, C39; Examples 38, 40

Selected Series 3 nanocomposite coated film substrates with nanoparticle loadings as given in Table 9 were reactive ion etched for 30 seconds in oxygen to yield nanostructured surface substrates. Both nanocomposite coated film substrates (i.e., not nanostructured) and the reactive ion etched nanostructured surface nanocomposite coated substrates were coated with a sol-gel derived alumina based layer by dip coating with the sol-gel alumina precursor solution at a dip speed of 25 cm/minute, for a target alumina based coating thickness of approximately 1 micrometer. The Series 3 nanocomposite coatings (i.e., organic (first) layer) are estimated to have an elastic storage modulus of between $1\times10^9$ pascals and less than $1\times10^{10}$ pascals (Hideki Sugimoto, Kazuki Daimatsu, Eiji Nakanishi, Yutaka Ogasawara, Takashi Yasumura, Katsuhiro Inomata, "Preparation and properties of poly(methylmethacrylate)-silica hybrid materials incorporating reactive silica nanoparticles," *Polymer* 47, 3754-3759 (2006); B. Ramezanzadeh, M. Mohseni, H. Yari, S. Sabbaghian "A study of thermal-mechanical properties of an automotive coating exposed to natural and simulated bird droppings," *Journal of Thermal Analysis and Calorimetry* 102, 13-21 (2010)).

TABLE 9

| Example No. | 75 nm SiO$_2$ Particle Loading (wt %) | 75 nm SiO$_2$ Particle Loading (vol %) | Reactive Ion Etching Time seconds |
| --- | --- | --- | --- |
| C37 | 20% | 12% | n/a |
| 38 | 20% | 12% | 30 |
| C39 | 40% | 27% | n/a |
| 40 | 40% | 27% | 30 |

The abrasion resistance of the ceramic coated nanocomposite coated film substrates (Comparative Examples C37 and C39) and the nanostructured surface nanocomposite substrates (Examples 38 and 40) was measured, and results are given in Table 10.

TABLE 10

| Example No. | Haze before Abrasion (%) | Haze after Abrasion (%) | Change in Haze with Abrasion (%) |
| --- | --- | --- | --- |
| C37 | 2.45 | 16.9 | 14.5 |
| 38 | 3.44 | 13.4 | 10.0 |
| C39 | 1.38 | 12.0 | 10.6 |
| 40 | 1.66 | 10.2 | 8.5 |

All of the patents and patent applications mentioned above are hereby expressly incorporated by reference. In the event that any inconsistency exists between the disclosure of the present application and the disclosure(s) of any document incorporated herein by reference, the disclosure of the present application shall govern. The embodiments described above are illustrative of the present invention and other constructions are also possible. Accordingly, the present invention should not be deemed limited to the embodiments described in detail above and shown in the accompanying drawings, but instead only by a fair scope of the claims that follow along with their equivalents.

The invention claimed is:

1. An article comprising:
   a. an organic layer having a nanostructured first surface comprising nanofeatures defining nanorecesses and an opposing second surface; and
   b. a ceramic layer disposed on the nanostructured first surface of the organic layer and filling at least a portion of the nanorecesses, wherein the ceramic layer has a nanostructured first surface comprising nanofeatures and a substantially planar opposing second surface, wherein the nanostructured first surface of the ceramic layer is interpenetrated with the nanostructured first surface of the organic layer, and wherein the ceramic layer is an exterior layer.

2. The article of claim 1, wherein the article is transparent to visible light.

3. The article of claim 1, wherein the ceramic layer comprises a ceramic material selected from the group consisting of silicon dioxide, silicon carbide, silicon oxycarbide, silicon nitride, silicon oxynitride, aluminum oxide, titanium oxide, zirconium oxide, stabilized zirconium oxide, diamond, diamond-like carbon, diamond-like glass, and combinations thereof.

4. The article of claim 1, wherein the substantially planar opposing second surface of the ceramic layer is substantially parallel to the opposing second surface of the organic layer.

5. The article of claim 1, wherein the nanostructured surface of the organic layer comprises nanofeatures having a height of from 25 to 1000 nm, 50 to 500 nm, 100 to 750 nm, or 150 to 500 nm.

6. The article of claim 1, wherein the nanorecesses have a depth-to-width ratio of at least 1.5 to 1, at least 2 to 1, at least 3 to 1, at least 4 to 1, or at least 5 to 1.

7. The article of claim 1, wherein the nanorecesses have a depth of from 25 to 2000 nm, 50 to 1000 nm, 100 to 750 nm, or 150 to 500 nm.

8. The article of claim 1, wherein the article further comprises a polymer substrate adjacent to the opposing second surface of the organic layer.

9. The article of claim 1, wherein at least a portion of the nanostructured first surface of the organic layer further comprises a mask coated thereon.

10. A method of making an article, the method comprising:
   a. obtaining an organic layer having a nanostructured first surface comprising nanofeatures defining nanorecesses and an opposing second surface; and
   b. filling at least a portion of the nanorecesses of the nanostructured first surface of the organic layer with a ceramic layer of a ceramic material to form the article, wherein the ceramic layer has a nanostructured first surface comprising nanofeatures and a substantially planar opposing second surface, wherein the nanostructured first surface of the ceramic layer is interpenetrated with the nanostructured first surface of the organic layer, and wherein the ceramic layer is an exterior layer.

11. The method of claim 10, wherein the nanostructured first surface of the organic layer is formed by reactive ion etching the organic layer or by nanoreplication.

12. The method of claim 10, wherein the filling the nanorecesses of the nanostructured first surface of the organic layer with a ceramic material comprises chemical vapor deposition or chemical solution deposition.

13. The method of claim 12, wherein the chemical solution deposition comprises applying a sol-gel coating to the nanostructured first surface of the organic layer.

14. The method of claim 12, wherein the chemical solution deposition comprises applying a layer of a pre-ceramic polymer composition to the nanostructured first surface of the organic layer.

15. An article comprising:
   a. a first layer comprising a first material with a first elastic storage modulus of between $1\times10^6$ and less than $1\times10^{10}$ pascals and having a nanostructured first surface comprising nanofeatures defining nanorecesses and an opposing second surface; and
   b. a second layer comprising a second material with a second elastic storage modulus of between greater than $1\times10^{10}$ and $1.3\times10^{12}$ pascals disposed on the nanostructured first surface of the first layer and filling the nanorecesses;
   wherein the second material is non-metallic, wherein the second layer has a nanostructured first surface comprising nanofeatures and a substantially planar opposing second surface, wherein the nanostructured first surface of the second layer is interpenetrated with the nanostructured first surface of the first layer, and wherein the second layer is an exterior layer.

16. An article comprising:
   a. a first layer comprising a first material with a first elastic storage modulus and having a nanostructured first surface comprising nanofeatures defining nanorecesses and an opposing second surface; and
   b. a second layer comprising a second material with a second elastic storage modulus disposed on the nanostructured first surface of the first layer and filling the nanorecesses;
   wherein the second layer has a nanostructured first surface that is interpenetrated with the nanostructured first surface of the first layer, and a substantially planar opposing second surface; wherein the second material is non-metallic; wherein the second elastic storage modulus is at least 1.5 times the first elastic storage modulus, and wherein the second layer is an exterior layer.

17. The article of claim 1, wherein the organic layer comprises a polymeric matrix and a plurality of particles distributed in the polymeric matrix.

18. The article of claim 17, wherein the particles comprise a plurality of nanoparticles of $SiO_2$, $ZrO_2$, $TiO_2$, ZnO, $Al_2O_3$, calcium carbonate, magnesium silicate, indium tin oxide, antimony tin oxide, tungsten oxide, tungsten bronze, diamond, or combinations thereof.

19. The article of claim 17, wherein the polymeric matrix comprises a polymer selected from the group consisting of polycarbonate, poly(meth)acrylate, polyester, nylon, fluoropolymer, urethane, epoxy, cyclic olefin copolymer, triacetate cellulose, cellulose diacetate, and blends or copolymers thereof.

* * * * *